US012696116B2

(12) United States Patent
Qu et al.

(10) Patent No.: US 12,696,116 B2
(45) Date of Patent: Jul. 28, 2026

(54) SYSTEM AND METHOD FOR REFERENCE SIGNAL MEASUREMENT IN CONFIGURED BANDWIDTH PARTS

(71) Applicant: HUAWEI TECHNOLOGIES CO., LTD., Shenzhen (CN)

(72) Inventors: Weilin Qu, Beijing (CN); Zhe Jin, Beijing (CN); Zhihu Luo, Beijing (CN); Hailong Hou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 394 days.

(21) Appl. No.: 18/483,326

(22) Filed: Oct. 9, 2023

(65) Prior Publication Data

US 2024/0040413 A1 Feb. 1, 2024

Related U.S. Application Data

(63) Continuation of application No. PCT/CN2022/085830, filed on Apr. 8, 2022.

(30) Foreign Application Priority Data

Apr. 9, 2021 (CN) .......................... 202110384578.1

(51) Int. Cl.
*H04W 24/08* (2009.01)
*H04L 5/00* (2006.01)
*H04W 24/10* (2009.01)

(52) U.S. Cl.
CPC .......... *H04W 24/08* (2013.01); *H04L 5/0048* (2013.01); *H04W 24/10* (2013.01)

(58) Field of Classification Search
None
See application file for complete search history.

(56) References Cited

U.S. PATENT DOCUMENTS

2020/0068426 A1* 2/2020 Han .......................... H04L 1/06
2020/0228282 A1 7/2020 Kwak et al.
2021/0298037 A1* 9/2021 Matsumura ........... H04W 72/23
2021/0392532 A1 12/2021 Wu

FOREIGN PATENT DOCUMENTS

WO WO-2018194352 A1 * 10/2018 ............ H04W 72/23
WO 2020063434 A1 4/2020
WO 2020186534 A1 9/2020

* cited by examiner

*Primary Examiner* — Maharishi V Khirodhar
(74) *Attorney, Agent, or Firm* — Leydig, Voit & Mayer, Ltd.

(57) ABSTRACT

This application provides a communication method and apparatus, to improve convenience of measuring a reference signal on a bandwidth part (BWP), and improve measurement efficiency. A terminal device receives configuration information, where the configuration information indicates M reference signals configured on a first bandwidth part (BWP), the first BWP includes N starting resource block (RB) locations, N is a positive integer greater than 1, and M is a positive integer greater than or equal to 1; and the N starting RB locations of the first BWP are different. The terminal device measures at least one of the M reference signals on a BWP corresponding to the N starting RB locations of the first BWP, where in a same time unit, one of the N starting RB locations is used to measure the at least one of the M reference signals.

15 Claims, 10 Drawing Sheets

Core network
device 130

Access network
device 120

Terminal
device 110

Terminal
device 110

(a)

(b)

X1 = X2, and M−N ≥ symbol gap value (Symbol Gap Value), for example, symbol gap value (Symbol Gap Value) = 2 symbols (Symbol)

Second BWP (BWP ID1)

Second BWP (BWP ID2)

Second BWP (BWP ID3)

Second BWP (BWP ID4)

First BWP

Symbol gap

Start slot X1
Start symbol (Start Symbol) M

Start slot X2
Start symbol (Start Symbol) N

1200

1201

1202

Transceiver module

Processing module

SYSTEM AND METHOD FOR REFERENCE SIGNAL MEASUREMENT IN CONFIGURED BANDWIDTH PARTS

CROSS-REFERENCE TO RELATED APPLICATIONS

This application is a continuation of International Application No. PCT/CN2022/085830, filed on Apr. 8, 2022, which claims priority to Chinese Patent Application No. 202110384578.1, filed on Apr. 9, 2021. The disclosures of the aforementioned applications are hereby incorporated by reference in their entireties.

TECHNICAL FIELD

This application relates to the field of communications, and in particular, to a communication method and apparatus.

BACKGROUND

The concept of a bandwidth part (BWP) is introduced in a new radio (NR) communication system. The reason is that a bandwidth required for a terminal device is usually limited for a wide carrier bandwidth (for example, 100 MHz). Performing full bandwidth detection and maintenance, if any, brings great challenges to power consumption for the terminal device. Therefore, introduction of the concept of the BWP is to allocate a part of bandwidth in the entire carrier bandwidth for the terminal device to perform access and data transmission. The terminal device only needs to perform a corresponding operation on the configured bandwidth, thereby saving power consumption and reducing costs.

One or more BWPs may be configured for the terminal device in a serving cell, while only one BWP can be activated (active) at a time, and the terminal device can perform data transmission only on a current active BWP. For example, the terminal device performs measurement of a reference signal and reports a measurement result (for example, a channel state information) only on the current active BWP. For a reduced capability (REDCAP) terminal device or a narrowband (NB) terminal device, due to narrowness of operating bandwidths of the terminal devices, if channel state information of a frequency location at which the current active BWP is located can be measured and reported only, a base station cannot obtain channel states of other frequency locations in the wide bandwidth of the entire NR system. As a result, the base station cannot schedule the terminal device for data transmission at a frequency location with an optimal channel state.

SUMMARY

This application is to provide a communication method and apparatus, to help obtain channel states at a plurality of frequency locations in an NR system, and help a network device schedule a terminal device to operate at a frequency location with a relatively good channel state.

According to a first aspect, a communication method is provided. An execution body of the method may be a terminal device, or may be a chip used in a terminal device. Descriptions are provided below by using an example in which the execution body is a terminal device. The terminal device receives configuration information, where the configuration information indicates M reference signals configured on a first bandwidth part BWP, the first BWP includes N starting resource block RB locations, N is a positive integer greater than 1, and M is a positive integer greater than or equal to 1; and the N starting RB locations of the first BWP are different. The terminal device measures at least one of the M reference signals on a BWP corresponding to the N starting RB locations of the first BWP, where in a same time unit, one of the N starting RB locations is used to measure the at least one of the M reference signals.

The configuration information may be carried in radio resource control (RRC) signaling, or in other signaling. This is not limited in embodiments of this application.

It is to be noted that, the N starting RB locations of the first BWP may be N starting physical resource block PRB locations of the first BWP. Alternatively, the N starting RB locations of the first BWP may be referred to as N starting frequency locations of the first BWP, N starting frequency domain locations of the first BWP, or the like.

For a periodic measurement mode, after receiving the configuration information, the terminal device may periodically perform reference signal measurement on the BWPs corresponding to the N starting RB locations of the first BWP. For example, measurement is performed at intervals of several slots on the BWP corresponding to the N starting RB locations of the first BWP.

In embodiments of this application, one BWP (for example, the first BWP) includes N starting RB locations, and the N starting RB locations are different. For example, N=4, that is, the first BWP includes four starting RB locations, and the terminal device may measure a reference signal on BWPs corresponding to the four starting RB locations of the first BWP. In a same time unit, one of the four starting RB locations may be used to measure a reference signal. For example, reference information is a channel state information-reference signal (CSI-RS), that is, the terminal device may measure the CSI-RS at a plurality of starting RB locations of the first BWP. In this case, a network device may obtain channel state information (CSI) of the plurality of starting RB locations of the first BWP. In this way, the network device may schedule the terminal device to perform data transmission at a frequency location with a relatively good channel condition. For example, if a channel condition of a BWP corresponding to a starting RB location 1 in the BWPs corresponding to the four starting RB locations of the first BWP is relatively good, the terminal device is scheduled to perform data transmission on the BWP corresponding to the starting RB location 1. In this way, a frequency diversity gain may be obtained through data transmission, which helps improve coverage performance and spectral efficiency of information transmission.

In addition, the first BWP includes N different starting RB locations, which may be understood that other parameters (for example, a bandwidth and a subcarrier spacing) of BWPs corresponding to the N starting RB locations may be the same except for different frequency locations. Therefore, in embodiments of this application, when the terminal device needs to switch from the BWP corresponding to the starting RB location 1 of the first BWP to a BWP corresponding to a starting RB location 2 of the first BWP to perform reference signal measurement, only frequency locations need to be switched, with no need to reload a parameter set of the BWPs corresponding to the starting RB locations of the first BWP. In this way, efficiency of measuring reference signals at the N starting RB locations of the first BWP can be improved.

In a possible design, the configuration information further indicates a sequence of the N starting RB locations of the first BWP corresponding to the at least one of the M reference signals when the at least one of the M reference signals is measured.

It is assumed that four reference signals (M=4) are configured for the first BWP, the configuration information may indicate a sequence of a plurality of starting RB locations of the first BWP corresponding to two reference signals when the two reference signals of the four reference signals are measured. For example, the two reference signals correspond to the starting RB location 1 and the starting RB location 2 of the first BWP (for example, a reference signal 1 corresponds to the starting RB location 1, and a reference signal 2 corresponds to the starting RB location 2), the configuration information indicates a sequence of the starting RB location 1 and the starting RB location 2. For example, the reference signal 1 is first measured on the BWP corresponding to the starting RB location 1, and then the reference signal 2 is measured on the BWP corresponding to the starting RB location 2.

In the foregoing example, different starting RB locations of the first BWP correspond to different reference signals in the M reference signals. In some other examples, different starting RB locations of the first BWP may correspond to a same reference signal in the M reference signals. For example, four reference signals (M=4) are configured for the first BWP, and the BWPs corresponding to the N starting RB locations of the first BWP may all correspond to one of the four reference signals, for example, all correspond to the reference signal 1. Assuming that a sequence indicated by the configuration information is {the starting RB location 1, the starting RB location 2}, the terminal device may first measure the reference signal 1 on the BWP corresponding to the starting RB location 1, and then measure the reference signal 1 on the BWP corresponding to the starting RB location 2.

In a possible design, start slots of reference signals measured on BWPs corresponding to at least two of the N starting RB locations of the first BWP are different, and a gap between the start slots of the reference signals is greater than a preset slot gap value.

For example, a start slot of a reference signal on the BWP corresponding to the starting RB location 1 of the first BWP is a slot X1; and start time domain of a reference signal on the BWP corresponding to the starting RB location 2 of the first BWP is a slot X2. The start slot X1 is different from the start slot X2, and a difference between the start slot X1 and the start slot X2 is greater than the preset slot gap value. In this case, it is assumed that the terminal device needs to switch from the BWP corresponding to the starting RB location 1 of the first BWP to the BWP corresponding to the starting RB location 2 of the first BWP to perform reference signal measurement. Because a gap between the start slot X1 of the reference signal on the BWP corresponding to the starting RB location 1 of the first BWP and the start slot X2 of the reference signal on the BWP corresponding to the starting RB location 2 of the first BWP is greater than the preset slot gap value, the terminal device may have a relatively sufficient time to perform frequency switching, that is, switching from the starting RB location 1 of the first BWP to the starting RB location 2 of the first BWP. This avoids that frequency is not switched to the starting RB location 2 of the first BWP due to insufficient time, and the start slot X2 of the reference signal on the BWP corresponding to the starting RB location 2 of the first BWP is reached in terms of time.

In a possible design, start slots of reference signals measured on BWPs corresponding to at least two of the N starting RB locations of the first BWP are the same, and a start symbol gap of the reference signals in a slot corresponding to the start slot is greater than a preset symbol gap value.

For example, start time domain of a reference signal on the BWP corresponding to the starting RB location 1 of the first BWP is a slot X1; and start time domain of a reference signal on the BWP corresponding to the starting RB location 2 of the first BWP is a slot X2. The start slot X1 is the same as the start slot X2, but a gap between start symbols of the reference signals in the start slot X1 and the start slot X2 is greater than the preset symbol gap value. For example, each of the start slot X1 and the start slot X2 is a slot1, a start symbol of the reference signal on the BWP corresponding to the starting RB location 1 of the first BWP in the slot1 is a symbol M, a start symbol of the reference signal on the BWP corresponding to the starting RB location 2 of the first BWP in the slot1 is a symbol N, and a gap between the start symbol M and the start symbol N is greater than the preset symbol gap value. A specific value of the preset symbol gap value is not limited in embodiments of this application, for example, may be two symbols. In this way, time intervals of reference signals on BWPs corresponding to at least two of the N starting RB locations of the first BWP are symbol-level intervals, and a granularity is finer, which helps improve efficiency of measuring reference signals.

In a possible design, the method further includes: sending a measurement result on a BWP corresponding to at least one of the N starting RB locations of the first BWP, where the measurement result includes measurement results of the reference signals on the BWPs corresponding to the at least two of the N starting RB locations of the first BWP. Therefore, in embodiments of this application, the terminal device may report the measurement results of the reference signals on the BWPs corresponding to the at least two of the N starting RB locations of the first BWP at a time, which has relatively high efficiency. In addition, the network device may obtain channel state information of a plurality of starting RB locations of the first BWP, so that the network device schedules the terminal device to perform data transmission on a BWP corresponding to a starting RB location with a relatively good channel condition. For example, if a channel condition of the BWP corresponding to the starting RB location 1 in the BWPs corresponding to the N starting RB locations of the first BWP is relatively good, the terminal device is scheduled to perform data transmission on the BWP corresponding to the starting RB location 1. In this way, a frequency diversity gain may be obtained through data transmission, which helps improve coverage performance and spectral efficiency of information transmission.

For a periodic measurement reporting mode, after receiving the configuration information, the terminal device may periodically send a measurement result on a BWP corresponding to at least one of the N starting RB locations of the first BWP. For example, the terminal device sends the measurement result on the BWP corresponding to the at least one of the N starting RB locations of the first BWP every several slots.

In a possible design, before the measuring at least one of the M reference signals on a BWP corresponding to the N starting RB locations of the first BWP, the method further includes: receiving first signaling, where the first signaling indicates to measure the at least one of the M reference signals on the BWP corresponding to the N starting RB locations of the first BWP, and the first signaling is media access control MAC signaling or downlink control information DCI.

For example, the received first signaling is MAC signaling, and the terminal device may periodically perform reference signal measurement on the BWPs corresponding to the N starting RB locations of the first BWP, that is, perform measurement (periodic measurement) at intervals of one or more slots until the terminal device receives MAC signaling that indicates to deactivate/end the measurement mode.

For example, the first signaling received is DCI, and the terminal device may perform reference signal measurement on the BWPs corresponding to the N starting RB locations of the first BWP. It is to be specially noted that the measurement is aperiodic.

In other words, after sending the configuration information, the network device may further indicate (or trigger or activate), by using the first signaling, the terminal device to measure at least one of the M reference signals on the BWP corresponding to the N starting RB locations of the first BWP.

In a possible design, before the sending a measurement result on a BWP corresponding to at least one of the N starting RB locations of the first BWP, the method further includes: receiving second signaling, where the second signaling indicates to send the measurement result on the BWP corresponding to the at least one of the N starting RB locations of the first BWP, and the measurement result includes the measurement results of the reference signals on the BWPs corresponding to the at least two of the N starting RB locations of the first BWP; and the second signaling is media access control MAC signaling or downlink control information DCI.

In other words, after configuring, by using the configuration information, the M reference signals corresponding to the first BWP, the network device may further indicate (or trigger or activate), by using the second signaling, to send the measurement results of the reference signals on the BWPs corresponding to the at least two of the N starting RB locations of the first BWP on the BWP corresponding to the at least one of the N starting RB locations. For example, the second signaling received by the terminal device is MAC signaling, and the terminal device may periodically send the measurement results on the BWP corresponding to the at least one of the plurality of starting RB locations of the first BWP, that is, report (for example, periodically report) at intervals of one or more slots until MAC signaling used to indicate to deactivate/end the reporting mode is received. For example, the measurement results may be measurement results of reference signals on BWPs corresponding to at least two of the N starting RB locations.

For example, the second signaling received by the terminal device is DCI, and the terminal device may report the measurement results on the BWP corresponding to the at least one of the plurality of starting RB locations of the first BWP. The measurement results are measurement results of the reference signals on the BWPs corresponding to the at least two of the N starting RB locations. In this scenario, reporting may be performed once, that is, aperiodic reporting.

In a possible design, the method further includes: triggering, by using the first signaling, measurement of a reference signal on a BWP corresponding to a current starting RB location in the N starting RB locations of the first BWP; and if the current starting RB location is different from the $1^{st}$ starting RB location in a measurement sequence and/or the current starting RB location is different from a measurement start location configured by the network device, performing measurement on a reference signal on a BWP corresponding to another RB location that is in the measurement sequence and that is after the current starting RB location, or performing cyclic measurement based on the measurement sequence.

In a possible design, before the sending a measurement result on a BWP corresponding to at least one of the N starting RB locations of the first BWP, the method further includes: if a first time domain location used to send the measurement results overlaps a second time domain location, using the second time domain location to report a measurement result of a reference signal on a BWP corresponding to a single RB location; determining that a reporting priority of measurement results at multiple RB locations is higher than a reporting priority of a measurement result at the single RB location; and sending the measurement results on the BWP corresponding to the at least one of the N starting RB locations.

According to a second aspect, a communication method is provided. An execution body of the method may be a network device, or may be a chip used in a network device. Descriptions are provided below by using an example in which the execution body is a network device. The network device generates configuration information, where the configuration information indicates M reference signals configured on a first bandwidth part BWP, the first BWP includes N starting resource block RB locations, N is a positive integer greater than 1, and M is a positive integer greater than or equal to 1; and the N starting RB locations of the first BWP are different. The network device sends the configuration information.

In a possible design, the configuration information further indicates a sequence of the N starting RB locations of the first BWP corresponding to the at least one of the M reference signals when the at least one of the M reference signals is measured.

In a possible design, start slots of reference signals measured on BWPs corresponding to at least two of the N starting RB locations of the first BWP are different, and a gap between the start slots of the reference signals is greater than a preset slot gap value; or start slots of reference signals measured on BWPs corresponding to at least two of the N starting RB locations of the first BWP are the same, and a start symbol gap of the reference signals in a slot corresponding to the start slot is greater than a preset symbol gap value.

In a possible design, the method further includes: receiving a measurement result on a BWP corresponding to at least one of the N starting RB locations of the first BWP, where the measurement result includes measurement results of the reference signals on the BWPs corresponding to the at least two of the N starting RB locations.

In a possible design, the method further includes: sending first signaling, where the first signaling indicates to measure the at least one of the M reference signals on a BWP corresponding to the N starting RB locations of the first BWP, and the first signaling is media access control MAC signaling or downlink control information DCI signaling.

In a possible design, before the sending a measurement result on a BWP corresponding to at least one of the N starting RB locations of the first BWP, the method further includes: sending second signaling, where the second signaling indicates to send the measurement result on the BWP corresponding to the at least one of the N starting RB locations of the first BWP, and the measurement result includes the measurement results of the reference signals on the BWPs corresponding to the at least two of the N starting RB locations of the first BWP; and the second signaling is media access control MAC signaling or downlink control information DCI.

For advantageous effects of the second aspect, refer to advantageous effects of the first aspect. Details are not described herein again.

According to a third aspect, a communication method is further provided. An execution body of the method may be a terminal device, or may be a chip used in a terminal device. Descriptions are provided below by using an example in which the execution body is a terminal device. The terminal device receives configuration information, where the configuration information indicates to measure reference signals on a plurality of second BWPs on a first BWP, the plurality of second BWPs correspond to M reference signals, and each second BWP corresponds to at least one of the M reference signals; and the first BWP includes the plurality of second BWPs. The terminal device separately measures at least one of the M reference signals on each second BWP, where in a same time unit, one of the plurality of second BWPs is used to measure at least one of the M reference signals.

The configuration information may be carried in radio resource control (RRC) signaling, or in other signaling. This is not limited in embodiments of this application.

For a periodic measurement mode, after receiving the configuration information, the terminal device may periodically perform reference signal measurement on the plurality of second BWPs of the first BWP, for example, perform measurement (periodic measurement) on the plurality of second BWPs of the first BWP at intervals of one or more slots.

In other words, in embodiments of this application, one first BWP includes a plurality of second BWPs. The terminal device may measure reference signals on the plurality of second BWPs of the first BWP. For example, reference information is a CSI-RS, and the network device may obtain CSI of the plurality of second BWPs of the first BWP. In this way, the network device may schedule the terminal device to perform data transmission on a second BWP with a relatively good channel condition. For example, if a channel condition of a second BWP in the plurality of second BWPs of the first BWP is relatively good, the terminal device is scheduled to perform data transmission on the second BWP.

In addition, that the first BWP includes a plurality of second BWPs may be understood that parameters of the plurality of second BWPs of the first BWP may be the same. Alternatively, it may be understood that the plurality of second BWPs of the first BWP may share (or pool) one configuration parameter (for example, referred to as a common parameter set), and the configuration parameter may include parameters such as a bandwidth, a subcarrier spacing, and the like. In this case, when the terminal device performs reference signal measurement (for example, switchover, radio frequency retuning, retuning, radio frequency handover, fast retuning, and fast switchover) on different second BWPs of the first BWP, there is no need to reload the parameter set. This because configuration parameters of the plurality of second BWPs of the first BWP are the same. In this way, measurement efficiency can be improved.

In a possible design, the configuration information further indicates a sequence of the plurality of second BWPs of the first BWP corresponding to at least one of the M reference signals when the at least one of the M reference signals is measured.

In a possible design, start slots of reference signals measured on at least two of the plurality of second BWPs of the first BWP are different, and a gap between the start slots of the reference signals is greater than a preset slot gap value; or start slots of reference signals measured on at least two of the plurality of second BWPs of the first BWP are the same, and a gap between start symbols of the reference signals in the start slot is greater than a preset symbol gap value.

In a possible design, the method further includes: sending a measurement result on at least one of the plurality of second BWPs of the first BWP, where the measurement result includes measurement results of reference signals on at least two of the plurality of second BWPs of the first BWP.

For a periodic measurement reporting mode, after receiving the configuration information, the terminal device may periodically report the measurement result on the at least one of the plurality of second BWPs of the first BWP. For example, the terminal device sends the measurement result on the at least one of the plurality of second BWPs of the first BWP at intervals of several slots.

In a possible design, before the measuring at least one of the M reference signals on each second BWP, the method further includes: receiving first signaling, where the first signaling indicates to measure at least one of the M reference signals on the plurality of second BWPs of the first BWP, and the first signaling is media access control MAC signaling or downlink control information DCI signaling.

For example, the first signaling received by the terminal device is MAC signaling, and reference signal measurement may be periodically performed on the plurality of second BWPs of the first BWP, that is, measurement in this measurement mode is performed at intervals of several slots until the terminal device receives MAC signaling that indicates to deactivate/end the measurement mode.

For example, the first signaling received by the terminal device is DCI, and the terminal device may perform reference signal measurement, that is, aperiodic measurement, on the plurality of second BWPs of the first BWP.

In a possible design, before the sending a measurement result on at least one of the plurality of second BWPs of the first BWP, the method further includes: receiving second signaling, where the second signaling indicates to send a measurement result on at least one of the plurality of second BWPs of the first BWP, and the measurement result includes measurement results of reference signals on at least two of the plurality of second BWPs of the first BWP; and the second signaling is media access control MAC signaling and/or downlink control information DCI.

For example, the second signaling received by the terminal device is MAC signaling, and the measurement result may be periodically sent on the at least one of the plurality of second BWPs of the first BWP, that is, the reporting mode is performed at intervals of one or more slots until MAC signaling used to indicate to deactivate/end the reporting mode is received.

For example, the second signaling received by the terminal device is DCI, and the measurement result may be sent on the at least one of the plurality of second BWPs of the first BWP, that is, aperiodic reporting is performed.

In a possible design, the method further includes: triggering, by using the first signaling, measurement of a reference signal on a current second BWP of the first BWP, and if the current second BWP is different from the 1$^{st}$ second BWP in a measurement sequence and/or the current second BWP is different from a measurement start BWP configured by the network device, performing measurement on a reference signal of another second BWP that is in the measurement sequence and that is after the current second BWP, or performing cyclic measurement on the measurement sequence.

In a possible design, before the sending a measurement result on at least one of the plurality of second BWPs of the first BWP, the method further includes: if a first time domain location used to send the measurement results overlaps a second time domain location, using the second time domain location to report a measurement result of a reference signal on a single second BWP; determining, by the terminal device, that a reporting priority of measurement results on a plurality of second BWPs is higher than a reporting priority of a measurement result on the signal second BWP; and sending the measurement result on the at least one of the plurality of second BWPs of the first BWP.

According to a fourth aspect, a communication method is further provided. An execution body of the method may be a network device, or may be a chip used in a network device. Descriptions are provided below by using an example in which the execution body is a network device. The network device generates configuration information, where the configuration information indicates to measure reference signals on a plurality of second BWPs on a first BWP, the plurality of second BWPs correspond to M reference signal resources, and each second BWP corresponds to at least one of the M reference signal resources; and the first BWP includes the plurality of second BWPs. The network device sends the configuration information, where in a same time unit, one of the plurality of second BWPs is used to measure the at least one of the M reference signals.

In a possible design, configuration parameters of the plurality of second BWPs may be the same.

In a possible design, the configuration information further indicates a sequence of the plurality of second BWPs of the first BWP corresponding to at least one of the M reference signals when the at least one of the M reference signals is measured.

In a possible design, start slots of reference signals corresponding to at least two of the plurality of second BWPs of the first BWP are different, and a gap between the start slots of the reference signals is greater than a preset slot gap value; or start slots of reference signals corresponding to at least two of the plurality of second BWPs of the first BWP are the same, and a gap between start symbols in a slot corresponding to the start slot of the reference signals is greater than a preset symbol gap value.

In a possible design, the method further includes: receiving a measurement result on at least one of the plurality of second BWPs of the first BWP, where the measurement result includes measurement results performed by a terminal device by performing measurement on reference signals on at least two of the plurality of second BWPs of the first BWP.

In a possible design, the method further includes: sending first signaling, where the first signaling indicates to measure at least one of the M reference signals on the plurality of second BWPs of the first BWP, and the first signaling is media access control MAC signaling or downlink control information DCI.

In a possible design, the method further includes: sending second signaling, where the second signaling indicates to send a measurement result on at least one of the plurality of second BWPs of the first BWP, and the measurement result includes measurement results of reference signals on at least two of the plurality of second BWPs of the first BWP; and the second signaling is media access control MAC signaling or downlink control information DCI.

According to a fifth aspect, a communication apparatus is provided. For advantageous effects, refer to the descriptions in the first aspect. Details are not described herein again. The communication apparatus has a function of implementing behaviors in the method example of the first aspect. The function may be implemented by hardware, or may be implemented by hardware by executing corresponding software. The hardware or the software includes one or more modules corresponding to the foregoing function. In a possible design, the communication apparatus includes: a transceiver unit (or a transceiver module), configured to receive configuration information, where the configuration information indicates M reference signals configured on a first bandwidth part BWP, the first BWP includes N starting resource block RB locations, N is a positive integer greater than 1, and M is a positive integer greater than or equal to 1; and the N starting RB locations of the first BWP are different. The communication apparatus further includes: a processing unit (or a processing module), configured to measure at least one of the M reference signals on a BWP corresponding to the N starting RB locations of the first BWP, where in a same time unit, one of the N starting RB locations is used to measure the at least one of the M reference signals. These modules may perform corresponding functions in the method example in the first aspect. For details, refer to the detailed descriptions in the method example. Details are not described herein again.

According to a sixth aspect, a communication apparatus is provided. For advantageous effects, refer to the descriptions in the second aspect. Details are not described herein again. The communication apparatus has a function of implementing behaviors in the method example of the second aspect. The function may be implemented by hardware, or may be implemented by hardware by executing corresponding software. The hardware or the software includes one or more modules corresponding to the foregoing function. In a possible design, the communication apparatus includes: a processing unit (or a processing module), configured to generate configuration information, where the configuration information indicates M reference signals configured on a first bandwidth part BWP, the first BWP includes N starting resource block RB locations, N is a positive integer greater than 1, and M is a positive integer greater than or equal to 1; and the N starting RB locations of the first BWP are different. The communication apparatus further includes: a transceiver unit (or a transceiver module), configured to send the configuration information. These modules may perform corresponding functions in the method example in the second aspect. For details, refer to the detailed descriptions in the method example. Details are not described herein again.

According to a seventh aspect, a communication apparatus is provided. For advantageous effects, refer to the descriptions in the third aspect. Details are not described herein again. The communication apparatus has a function of implementing behaviors in the method example of the first aspect. The function may be implemented by hardware, or may be implemented by hardware by executing corresponding software. The hardware or the software includes one or more modules corresponding to the foregoing function. In a possible design, the communication apparatus includes: a transceiver unit (or a transceiver module), configured to receive configuration information, where the configuration information indicates to measure reference signals on a plurality of second BWPs on a first BWP, the plurality of second BWPs correspond to M reference signal resources, and each second BWP corresponds to at least one of the M reference signal resources; and the first BWP includes the plurality of second BWPs. The communication apparatus further includes: a processing unit (or a processing module), configured to measure at least one of the M reference signals on each second BWP. These modules may perform corresponding functions in the method example in the first aspect. For details, refer to the detailed descriptions in the method example. Details are not described herein again.

According to an eighth aspect, a communication apparatus is provided. For advantageous effects, refer to the descriptions in the fourth aspect. Details are not described herein again. The communication apparatus has a function of implementing behaviors in the method example of the second aspect. The function may be implemented by hardware, or may be implemented by hardware by executing corresponding software. The hardware or the software includes one or more modules corresponding to the foregoing function. In a possible design, the communication apparatus includes: a processing unit (or a processing module), configured to generate configuration information, where the configuration information indicates to measure reference signals on a plurality of second BWPs on a first BWP, the plurality of second BWPs correspond to M reference signal resources, and each second BWP corresponds to at least one of the M reference signal resources; and the first BWP includes the plurality of second BWPs. The communication apparatus further includes a transceiver unit (or a transceiver module), configured to send the configuration information. These modules may perform corresponding functions in the method example in the second aspect. For details, refer to the detailed descriptions in the method example. Details are not described herein again.

According to a ninth aspect, a communication apparatus is provided. The communication apparatus may be the terminal device in the foregoing method embodiments, or may be a chip disposed in the terminal device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the terminal device in the foregoing method embodiments.

According to a tenth aspect, a communication apparatus is provided. The communication apparatus may be the network device in the foregoing method embodiments, or may be a chip disposed in the terminal device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the network device in the foregoing method embodiments.

According to an eleventh aspect, a computer program product is provided. The computer program product includes computer program code. When the computer program code is run, the method performed by the terminal device in the foregoing aspects is performed.

According to a twelfth aspect, a computer program product is provided. The computer program product includes computer program code. When the computer program code is run, the method performed by the network device in the foregoing aspects is performed.

According to a thirteenth aspect, this application provides a chip system. The chip system includes a processor, configured to implement functions of the terminal device in the methods in the foregoing aspects. In a possible design, the chip system further includes a memory, configured to store program instructions and/or data. The chip system may include a chip, or may include a chip and another discrete component.

According to a fourteenth aspect, this application provides a chip system. The chip system includes a processor, configured to implement functions of the network device in the methods in the foregoing aspects. In a possible design, the chip system further includes a memory, configured to store program instructions and/or data. The chip system may include a chip, or may include a chip and another discrete component.

According to a fifteenth aspect, this application provides a computer-readable storage medium. The computer-readable storage medium stores a computer program. When the computer program is run, the method performed by the terminal device in the foregoing aspects is implemented.

According to a sixteenth aspect, this application provides a computer-readable storage medium. The computer-readable storage medium stores a computer program. When the computer program is run, the method performed by the network device in the foregoing aspects is implemented.

DESCRIPTION OF EMBODIMENTS

Figure 1:
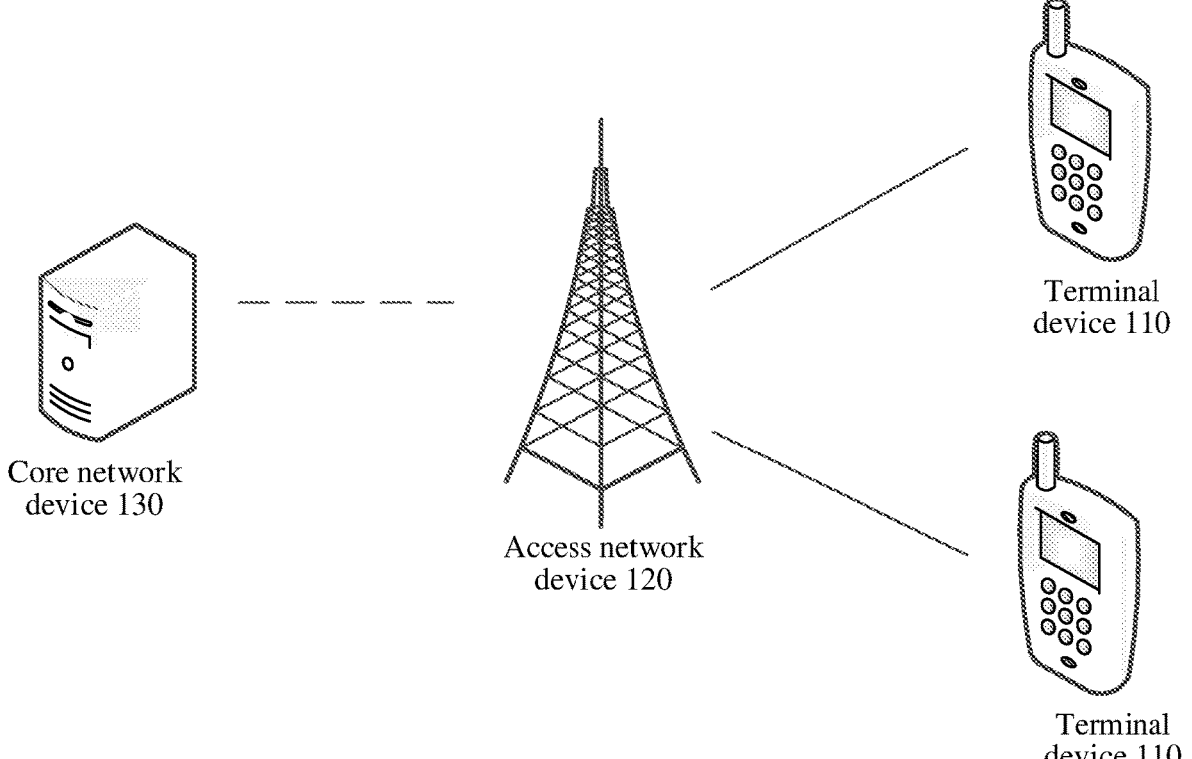
FIG. 1 is a schematic diagram of a network structure according to an embodiment of this application.

FIG. 1 is a schematic diagram of a possible network architecture to which an embodiment of this application is applicable. The network architecture includes a terminal device 110 and an access network device 120. The terminal device 110 and the access network device 120 may communicate with each other through a Uu air interface. The Uu air interface may be understood as a universal UE to network interface. Transmission through the Uu air interface includes uplink transmission and downlink transmission.

Optionally, the network architecture shown in FIG. 1 may further include a core network device 130. The terminal device 110 may be connected to the access network device 120 in a wireless manner, and the access network device 120 may be connected to the core network device 130 in a wired or wireless manner. The core network device 130 and the access network device 120 may be separated different physical devices. Alternatively, the core network device 130 and the access network device 120 may be a same physical device, and all or some logical functions of the core network device 130 and the access network device 120 are integrated into the physical device.

It is to be noted that, in the network architecture shown in FIG. 1, the terminal device 110 may be at a fixed location, or may be movable. This is not limited. The network architecture shown in FIG. 1 may further include another network device, for example, a wireless relay device, a wireless backhaul device, or the like. This is not limited. In the architecture shown in FIG. 1, quantities of terminal devices, access network devices, and core network devices are not limited.

The technical solutions in embodiments of this application may be applied to various communication systems, for example, a long term evolution (LTE) system, a 5th generation (5G) mobile communication system, a future mobile communication system, and the like.

In embodiments of this application, the terminal device 110 is a device with a wireless transceiver function or a chip that may be disposed in the device. Further, embodiments of this application may be applied to a reduced capability terminal device in an NR system, which is briefly referred to as a REDCAP terminal device below. Embodiments of this application may be further applied to a terminal device in a future update system, for example, a terminal device of an NR system release 17 (Rel-17) or a later release, or a terminal device in another system.

The terminal device 110 may be a terminal device having one or more of the following characteristics.

A carrier bandwidth of the terminal device 110 is not greater than 50 MHz, and is, for example, at least one of 50 MHz, 40 MHz, 20 MHz, 15 MHz, 10 MHz, or 5 MHz. Alternatively, the terminal device 110 may support two receive and one transmit (two receive antennas and one transmit antenna) or one receive and one transmit (one receive antenna and one transmit antenna). Alternatively, a maximum uplink transmit power of the terminal device 110 may range from 4 decibel milliwatt (dBm) to 20 dBm. Alternatively, the terminal device 110 may be a terminal device of an NR release 17 (Rel-17) or a release later than the NR Rel-17. Alternatively, the terminal device 110 supports half-duplex frequency division duplexing (FDD). Alternatively, a minimum delay between receiving downlink data and sending feedback on the downlink data by the terminal device 110 is greater than a minimum delay between receiving downlink data and sending feedback on the downlink data by another terminal device; and/or a minimum delay between sending uplink data and receiving feedback on the uplink data by the terminal device 110 is greater than a minimum delay between sending uplink data and receiving feedback on the uplink data by another terminal device. The another terminal device may be conventional UE or a terminal device of a release earlier than Rel-17. Alternatively, a baseband processing capability of the terminal device 110 is lower than that of the conventional UE or the terminal device of the release earlier than Rel-17. The baseband processing capability may include at least one of the following: a maximum quantity of MIMO layers supported by the terminal device during data transmission, a quantity of HARQ processes supported by the terminal device, and a maximum transmission block size (TBS) supported by the terminal device.

In embodiments of this application, the terminal device 110 may be a REDCAP terminal device in the NR system, or referred to as a REDCAP terminal device, a reduced capability terminal device, REDCAP UE, reduced capacity UE, mMTC UE, or the like. Certainly, the foregoing description is merely an example. There may be other differences between the REDCAP terminal device and a conventional terminal device, and examples are not described herein one by one.

In embodiments of this application, an apparatus configured to implement functions of a terminal may be a terminal device, or may be an apparatus that can support the terminal device in implementing the functions, for example, a chip system. The apparatus may be installed in the terminal device. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal device is the terminal device.

The network device may be an access network device. The access network device may also be referred to as a radio access network (RAN) device, and is a device that provides a wireless communication function for the terminal device. The access network device includes, for example, but is not limited to: a next generation NodeB (gNB) in 5G, an evolved NodeB (eNB), a baseband unit (BBU), a transmitting and receiving point (TRP), or a transmitting point (TP), a base station in a future mobile communication system, an access point in a Wi-Fi system, or the like. The access network device may also be a radio controller, a central unit (CU), and/or a distributed unit (DU) in a cloud radio access network (CRAN) scenario. Alternatively, the network device may be a relay station, an in-vehicle device, a network device in a future evolved PLMN network, or the like.

The terminal device may communicate with a plurality of access network devices of different technologies. For example, the terminal device may communicate with an access network device that supports long term evolution (LTE), may communicate with an access network device that supports 5G, and may further communicate with both the access network device that supports LTE and the access network device that supports 5G. This is not limited in embodiments of this application.

In embodiments of this application, an apparatus configured to implement functions of a network device may be a network device, or may be an apparatus that can support the network device in implementing the functions, for example, a chip system. The apparatus may be installed in the network device. In the technical solutions provided in embodiments of this application, the technical solutions provided in embodiments of this application are described by using an example in which the apparatus configured to implement the function of the network device is the network device.

A reference signal in embodiments of this application includes but is not limited to one or any combination of the following: a channel state information-reference signal (CSI-RS), a sounding reference signal (SRS), a physical broadcast channel block (PBCH Block), a cell reference signal (CRS), and a synchronization signal block (SSB).

For example, the reference signal is a CSI-RS. In the NR system, for a downlink, a terminal device can report channel state information (CSI) to a base station. Specifically, the base station first determines a resource used to carry the CSI-RS, and sends configuration information to the terminal device. The configuration information includes information about the resource used to carry the CSI-RS, and may further include information about a resource used by the terminal device to report the CSI to the base station, and includes information such as a condition for reporting the CSI. Then, the base station may send the CSI-RS to the terminal device. After receiving the configuration information, the terminal device receives the CSI-RS on the resource that is used to carry the CSI-RS and that is indicated by the configuration information, measures the CSI-RS, and when a reporting condition indicated by the configuration information is met, sends the CSI to the base station on the resource that is used to report the CSI and that is indicated by the configuration information.

It is to be noted that, descriptions are provided below by using the CSI-RS as an example. However, another type of parameter signal (for example, an SRS, an SSB, or a CRS) may also be applicable to the technical solutions of this application.

The sending of the CSI-RS may include three cases: periodic, semi-persistent, or aperiodic. The reporting of the CSI may also include three cases: periodic, semi-persistent, or aperiodic. Therefore, there are a plurality of combinations (nine combinations) for the sending of the CSI-RS and the reporting of the CSI. For example, in a case of periodic CSI-RS sending, there are three CSI reporting manners: periodic CSI reporting, semi-persistent CSI reporting, and aperiodic CSI reporting. Similarly, in a case of semi-persistent CSI-RS sending, there are three CSI reporting manners: periodic CSI reporting, semi-persistent CSI reporting, and aperiodic CSI reporting. Similarly, in a case of aperiodic CSI-RS sending, there are three CSI reporting manners: periodic CSI reporting, semi-persistent CSI reporting, and aperiodic CSI reporting.

Descriptions are provided below by using three cases as examples.

Case 1: The CSI-RS is periodically sent, and periodically reported.

Figure 2:
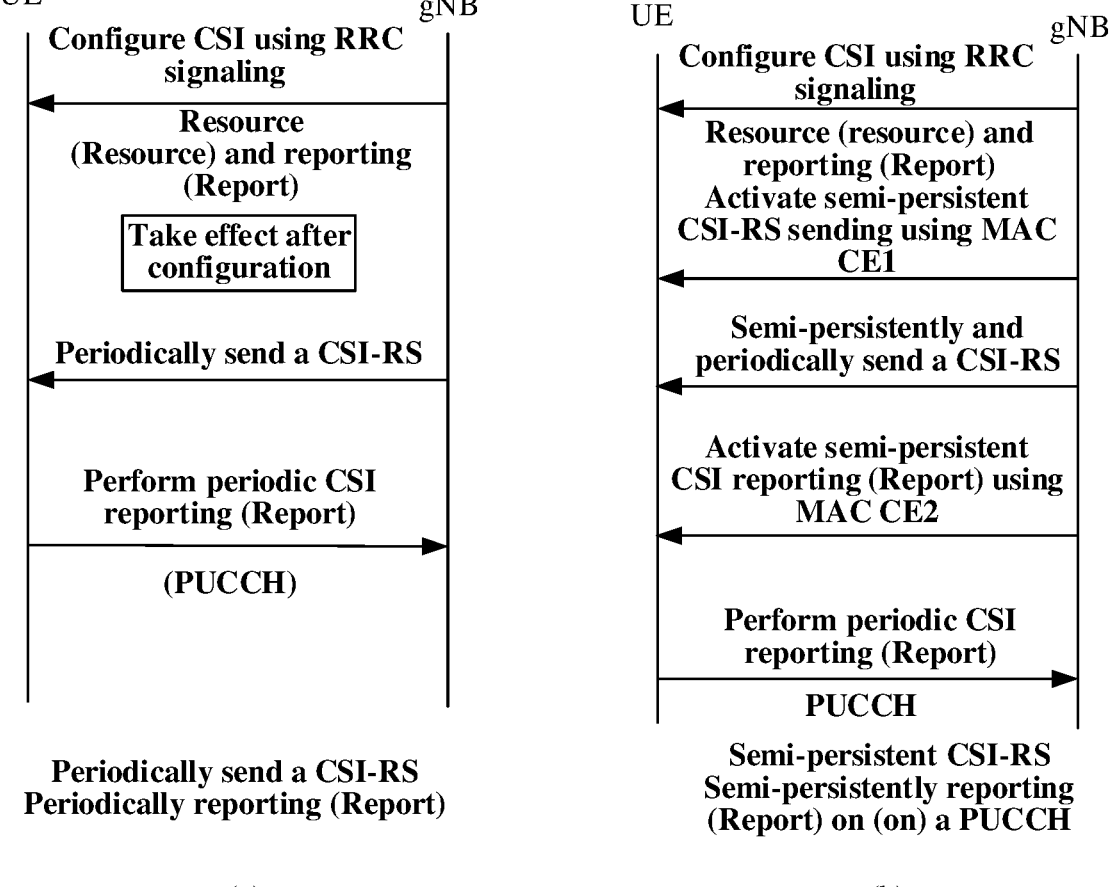
FIG. 2 and FIG. 3 are schematic flowcharts of a plurality of CSI-RS measurement procedures according to an embodiment of this application.

(a) in FIG. 2 is a schematic diagram of Case 1. For periodic CSI-RS sending and periodic CSI reporting, after the base station configures a CSI-RS resource and a CSI reporting resource by using configuration information (for example, RRC signaling), the configuration takes effect. The base station periodically sends the CSI-RS. Correspondingly, the terminal device periodically measures the CSI-RS, and periodically reports the CSI.

Case 2: The CSI-RS is semi-persistently sent, and semi-persistently reported.

(b) in FIG. 2 is a schematic diagram of Case 2. After the base station configures a CSI-RS resource and a CSI reporting resource by using configuration information (for example, RRC signaling), the configuration does not immediately take effect. The base station needs to trigger the configuration to come into effect using trigger signaling. For example, in (b) in FIG. 2, the base station activates (or triggers), by using MAC signaling 1, the terminal device to start to semi-persistently measure the CSI-RS. Still referring to (b) in FIG. 2, for semi-persistent CSI reporting, if the terminal device is configured to report the CSI on a PUCCH, the base station activates (or triggers), by using MAC signaling 2, the terminal device to semi-persistently report the CSI on the PUCCH.

Figure 3:
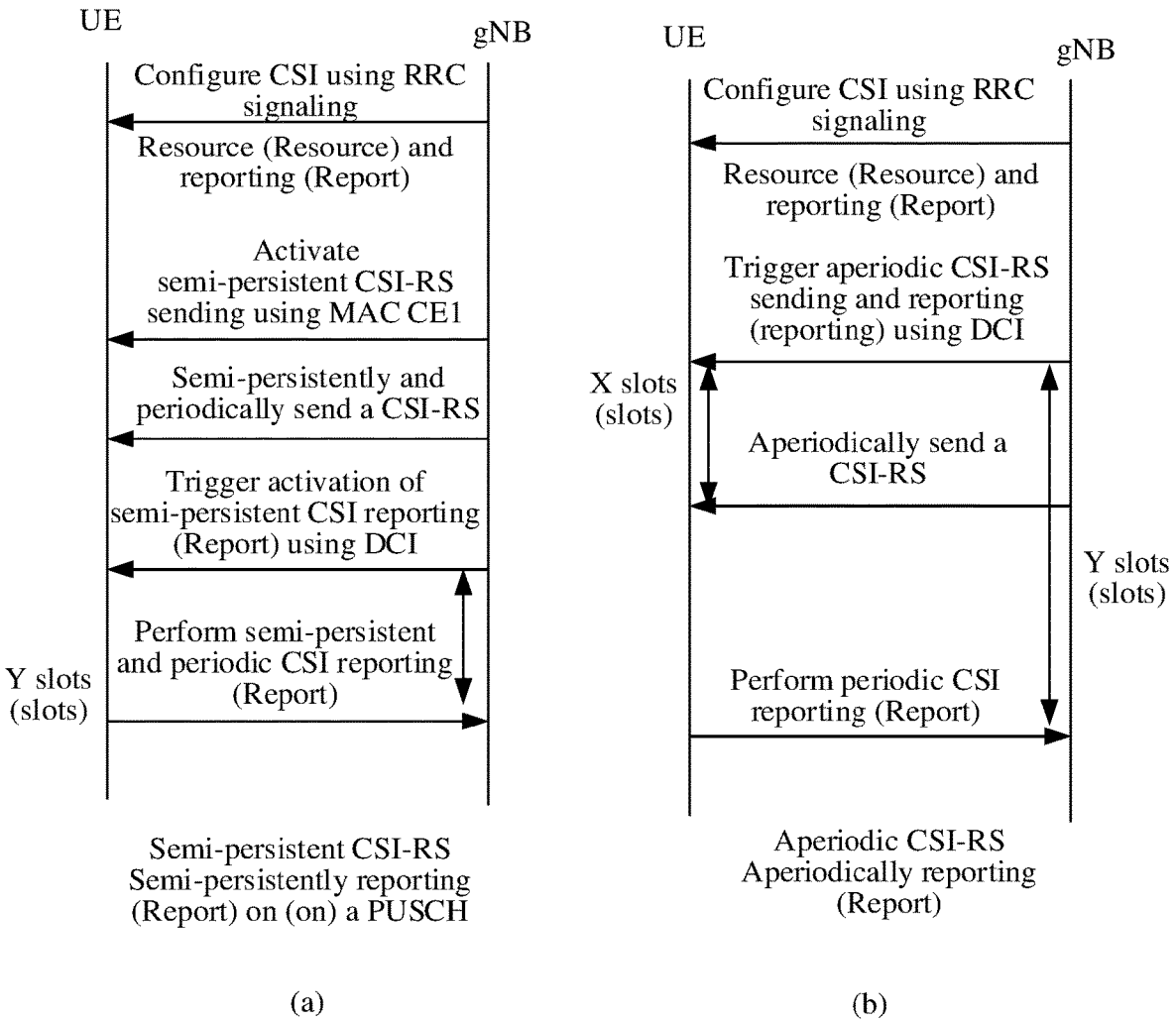

(a) in FIG. 3 is another schematic diagram of Case 2. The base station activates (or triggers), by using the MAC signaling 1, the terminal device to start to semi-persistently measure the CSI-RS. Still referring to (a) in FIG. 3, for semi-persistent CSI reporting, if the terminal device is configured to report CSI on a PUSCH, the base station triggers, by using the DCI, the terminal device to semi-persistently report the CSI on the PUSCH.

Case 3: The CSI-RS is aperiodically measured, and aperiodically reported.

(b) in FIG. 3 is a schematic diagram of Case 3. After the base station configures a CSI-RS resource and a CSI reporting resource by using configuration information (for example, RRC signaling), the configuration does not immediately take effect. The base station activates (or triggers), by using the DCI, the terminal device to aperiodically measure the CSI-RS and aperiodically report the CSI.

As described above, to resolve a problem that the base station cannot schedule the terminal device for data transmission at a frequency location with an optimal channel state, this application provides a solution in which N starting resource block (RB) locations on a first BWP are configured for the terminal device. In this way, the terminal device measures at least one of M reference signals on BWPs corresponding to the N starting RB locations of the first BWP, where in a same time unit, one of the N starting RB locations is used to measure the at least one of the M reference signals. In this way, a frequency diversity gain may be obtained through data transmission, which helps improve coverage performance and spectral efficiency of information transmission.

Figure 4:
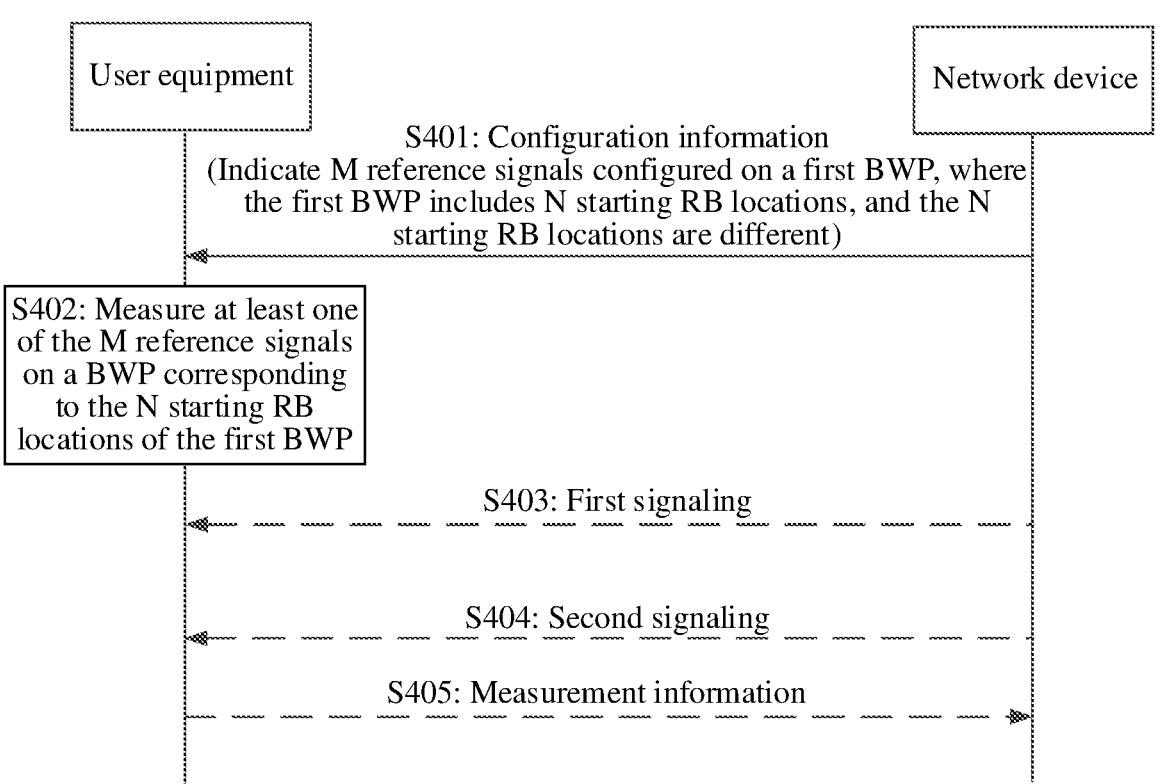
FIG. 4 is a schematic flowchart of a communication method according to an embodiment of this application.

FIG. 4 is a schematic flowchart of a communication method according to an embodiment of this application. As shown in FIG. 4, the procedure includes the following steps.

S401: A network device sends configuration information to a terminal device. Correspondingly, the terminal device receives the configuration information sent by the network device.

For example, the configuration information may be radio resource control (RRC) signaling, or may be another signaling. This is not limited in embodiments of this application. The "configuration information" in this specification may also be referred to as "measurement configuration information", or the like.

The configuration information indicates M reference signals configured on a first BWP, where the first BWP includes N starting resource block (RB) locations, and the N starting RB locations are different. N is a positive integer greater than 1, and M is a positive integer greater than or equal to 1.

For example, the configuration information includes at least one of the following information.

(1) An identifier of a first BWP, which uniquely identifies the first BWP. The identifier may be a BWP ID of the first BWP. It may be understood that different BWPs correspond to different BWP IDs. For example, a BWP1 corresponds to a BWP ID1, and a BWP2 corresponds to a BWP ID2. Assuming that the first BWP is the BWP1, the identifier of the first BWP is the BWP ID1.

(2) N starting RB locations. For example, N=4, that is, there are four starting RB locations: a starting RB location 1, a starting RB location 2, a starting RB location 3, and a starting RB location 4.

Figure 5:
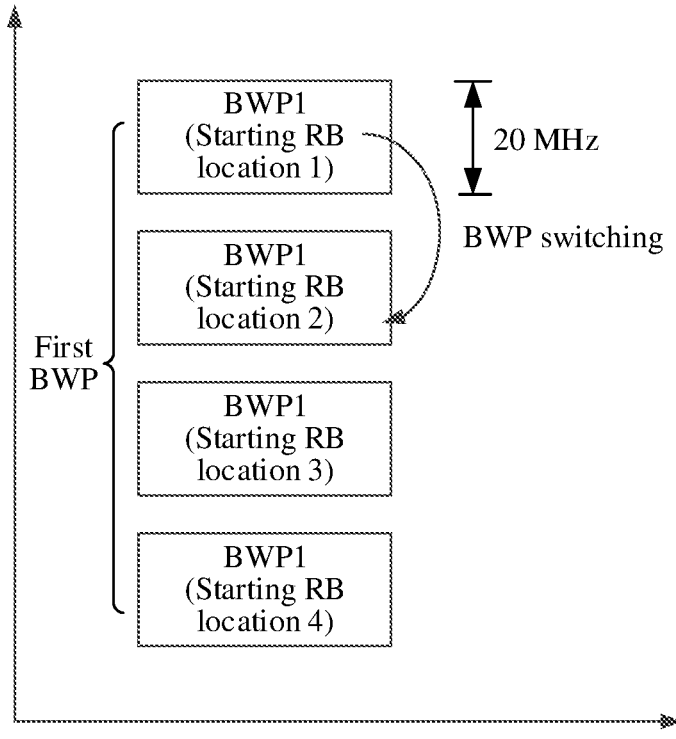
FIG. 5 is a schematic diagram of a first BWP configured for a terminal device according to an embodiment of this application.

FIG. 5 is a schematic diagram of four (N=4) starting RB locations corresponding to a first BWP. Therefore, in this embodiment of this application, the first BWP (for example, the BWP1) includes four (N=4) starting RB locations, and BWPs corresponding to the four starting RB locations included in the first BWP may share a same configuration parameter except for different frequency locations. Therefore, in this embodiment of this application, when the terminal device needs to switch from a BWP corresponding to the starting RB location 1 of the first BWP to a BWP corresponding to the starting RB location 2 of the first BWP to perform reference signal measurement, only frequency locations need to be switched. In this case, because a same configuration parameter is reused, efficiency of measuring reference signals at the four starting RB locations on the first BWP can be improved.

(3) Indication information, which indicates a mode for measuring reference signals at a plurality of starting RB locations of the first BWP. For example, the configuration information includes a field, and the field indicates whether to enable or activate the mode for measuring reference signals at a plurality of starting RB locations of the first BWP. For example, the field is a BWP multi-location measurement field. When indication information in the field is 1 bit, the field indicates to enable or activate the mode for measuring reference signals at a plurality of starting RB locations of the first BWP.

(4) Resources of the M reference signals. For example, the reference signal may be a CSI-RS.

(5) A correspondence between the N starting RB locations and M reference signal resources. In other words, there is a correspondence between the N starting RB locations and the M reference signal resources (for example, CSI-RS resources). For example, one starting RB location may correspond to one of the M reference signal resources, or one starting RB location may correspond to more of the M reference signal resources, or different starting RB locations may correspond to one or more same reference signal resources in the M reference signal resources, or different starting RB locations may correspond to a plurality of same reference signal resources in the M reference signal resources, where the plurality of same reference signal resources have a same frequency domain location resource and different time domain location resources.

(6) A valid starting RB location set, which indicates which starting RB locations in the N starting RB locations of the first BWP are to be measured. For example, four (N=4) starting RB locations are configured, where the valid starting RB location set may include three of the starting RB locations. For example, the set may be represented as {the starting RB location 1, the starting RB location 2, and the starting RB location 3}, which indicates that reference signal measurement may be performed on BWPs corresponding to the three starting RB locations. In other words, there is no need to perform reference signal measurement on a BWP corresponding to the starting RB location 4.

For example, the configuration information further indicates to arrange at least two starting RB locations of the N starting RB locations of the first BWP at which effective measurement is performed.

(7) A measurement sequence (pattern), which indicates a measurement sequence of BWPs corresponding to the N starting RB locations of the first BWP. For example, if the measurement sequence is {the starting RB location 3, the starting RB location 1, and the starting RB location 2}, a reference signal on a BWP corresponding to the starting RB location 3 is first measured, then a reference signal on a BWP corresponding to the starting RB location 1 is measured, and finally, a reference signal on a BWP corresponding to the starting RB location 2 is measured.

Optionally, the configuration information may be further used to indicate an identifier of a first starting RB location in the measurement sequence, a BWP identifier of a BWP corresponding to a first starting RB location, a default identifier (for example, a default ID) of a first starting RB location in a default measurement sequence, or a default BWP identifier (for example, a default ID) of a BWP corresponding to a first starting RB location.

Optionally, the configuration information may indicate one or more measurement sequences.

(8) A time offset between reference signals measured on BWPs corresponding to at least two of the N starting RB locations of the first BWP. The time offset may be a slot offset and/or a symbol offset. Descriptions are provided below by using the slot offset as an example.

In a possible implementation, start slots of reference signals measured on BWPs corresponding to at least two of the N starting RB locations of the first BWP are different, and a gap between the start slots of the reference signals is greater than a preset slot gap value. For example, referring to FIG. 6, start time domain of a reference signal on the BWP corresponding to the starting RB location 1 of the first BWP is a slot X1; and start time domain of a reference signal on the BWP corresponding to the starting RB location 2 of the first BWP is a slot X2. The start slot X1 is different from the start slot X2, and a difference between the start slot X1 and the start slot X2 is greater than the preset slot gap value.

That start slots of reference signals measured on BWPs corresponding to at least two starting RB locations of the N starting RB locations of the first BWP are different may include: Slot offsets of the reference signals measured on the BWPs corresponding to the at least two of the N starting RB locations of the first BWP are different, and sending periods of the reference signals measured on the BWPs corresponding to the at least two of the N starting RB locations of the first BWP are the same. The slot offset is a slot offset between a start slot of a reference signal and a reference point. The reference point may be any point (for example, a time domain location for sending first signaling or a time domain location for sending configuration information). For example, the reference point may be specified in a protocol. This is not limited in embodiments of this application.

Alternatively, that start slots of reference signals measured on BWPs corresponding to at least two starting RB locations of the N starting RB locations of the first BWP are different may include: Slot offsets of the reference signals measured on the BWPs corresponding to the at least two of the N starting RB locations of the first BWP are the same, and sending periods of the reference signals measured on the BWPs corresponding to the at least two of the N starting RB locations of the first BWP are different.

Figure 7:
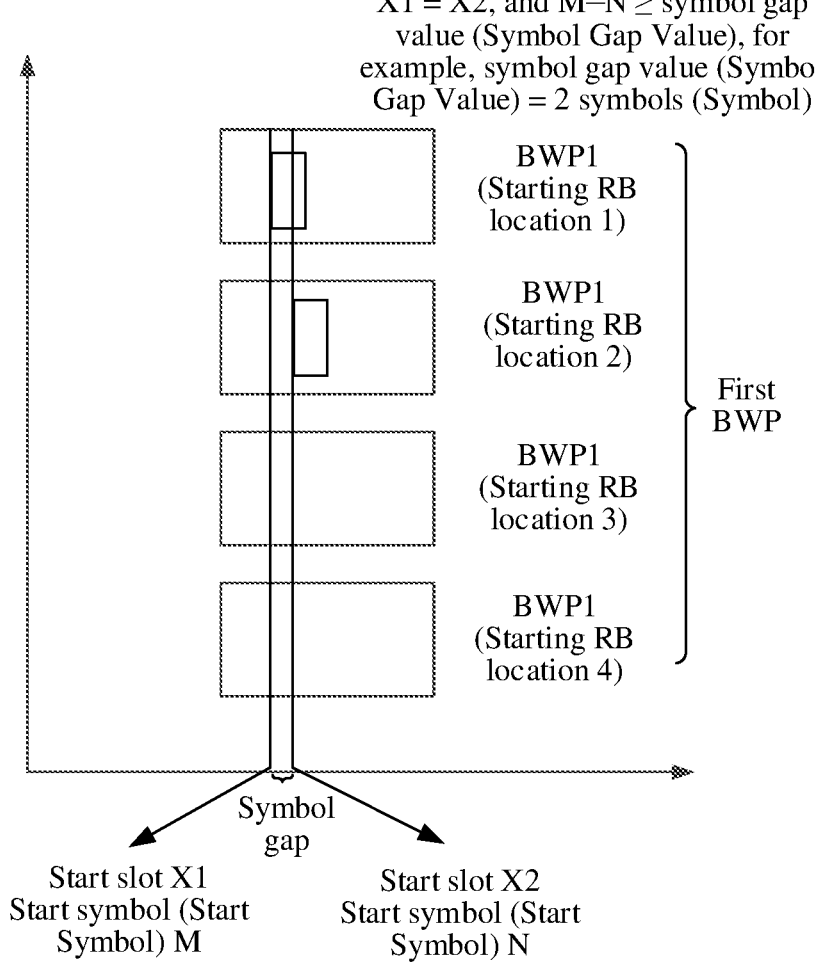
FIG. 7 is a schematic diagram of another slot relationship between M reference signal resources corresponding to N starting RB locations according to an embodiment of this application.

In another possible implementation, start slots of reference signals measured on BWPs corresponding to at least two of the N starting RB locations of the first BWP are the same, and a start symbol gap of the reference signals in the start slot is greater than a preset symbol gap value. For example, referring to FIG. 7, start time domain of a reference signal on the BWP corresponding to the starting RB location 1 of the first BWP is a slot X1; and start time domain of a reference signal on the BWP corresponding to the starting RB location 2 of the first BWP is a slot X2. The start slot X1 is the same as the start slot X2, but a gap between start symbols of the reference signals in the start slot X1 and the start slot X2 is greater than the preset symbol gap value. For example, each of the start slot X1 and the start slot X2 is a slot1, a start symbol of the reference signal on the BWP corresponding to the starting RB location 1 of the first BWP in the slot1 is a symbol M, a start symbol of the reference signal on the BWP corresponding to the starting RB location 2 of the first BWP in the slot1 is a symbol N, and a gap between the start symbol M and the start symbol N is greater than the preset symbol gap value.

That start slots of reference signals measured on BWPs corresponding to at least two of the N starting RB locations of the first BWP are the same may include: Slot offsets of the reference signals measured on the BWPs corresponding to the at least two of the N starting RB locations of the first BWP are the same, and sending periods of the reference signals measured on the BWPs corresponding to the at least two of the N starting RB locations of the first BWP are the same.

Figure 6:
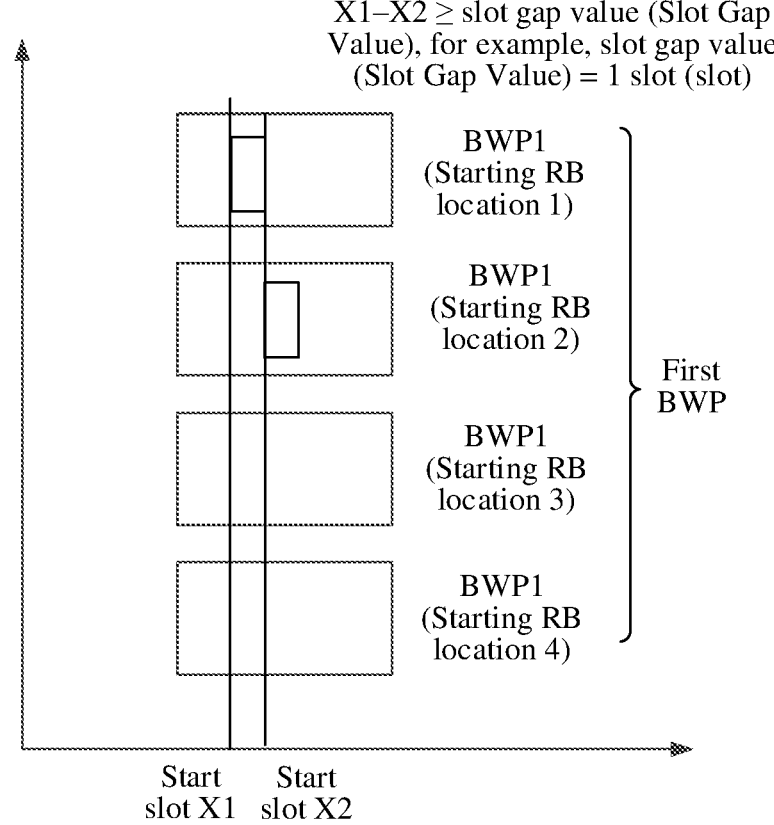
FIG. 6 is a schematic diagram of a slot relationship between M reference signal resources corresponding to N starting RB locations according to an embodiment of this application.

(9) A period, which indicates a sending period of the M reference signals. For example, periods of reference signals configured on BWPs corresponding to at least two of the N starting RB locations of the first BWP are the same. FIG. 6 is still used as an example. A period of a reference signal on the BWP1 corresponding to the starting RB location 1 may be the same as a period of a reference signal on the BWP2 corresponding to the starting RB location 2.

(10) Information about L reporting resources, where L is an integer greater than or equal to 1, the reporting resource is a resource used to report a measurement result, and the measurement result includes measurement results of reference signals on BWPs corresponding to at least two of the N starting RB locations.

Ten types of information are listed above, and one piece of configuration information may include one or more of the ten types of information. Alternatively, the network device may send a plurality of pieces of configuration information to the terminal device, where one piece of configuration information is used to configure one or more of the ten types of information, and the foregoing ten types of information are configured by using the plurality of pieces of configuration information. For example, before S401, step A may be further included. To be specific, the network device configures a sub carrier space-SpecificCarrier (SCS-SpecificCarrier) for the terminal device, and the SCS-SpecificCarrier may be used to determine a width of a carrier bandwidth, that is, a channel bandwidth configured for the terminal device. The SCS-SpecificCarrier is greater than a maximum bandwidth of the terminal device. For example, with reference to FIG. 1 and FIG. 5, originally, the terminal device operates on a bandwidth corresponding to one of the four BWPs in FIG. 1. Assuming that the terminal device operates on a bandwidth (for example, 20 MHz) corresponding to the BWP1, the terminal device can receive and transmit data only on the bandwidth. In this embodiment of this application, the network device configures, for the terminal device, a carrier bandwidth greater than the maximum bandwidth, for example, a frequency bandwidth (for example, 20 MHz) corresponding to the first BWP in FIG. 5 is greater than a frequency bandwidth (for example, 20 MHz) corresponding to the BWP1 in FIG. 1. It may be understood that, before step A, the method may further include the following steps. The network device determines the maximum bandwidth of the terminal device. For example, the terminal device (for example, periodically) reports a current operating frequency bandwidth to the network device. It is assumed that when a current active BWP of the terminal device is the BWP1, the BWP1 is reported to the network device as the current active BWP, and the network device configures, for the terminal device, a bandwidth that is beyond a bandwidth range of the BWP1. For example, before step A, the terminal device may further report information to the network device. The information indicates that the SCS-SpecificCarrier greater than the maximum bandwidth of the terminal device can be configured for the terminal device.

For example, the terminal device may further report capability information to the network device. The capability information indicates whether the terminal device has a capability of measuring reference signals on BWPs corresponding to a plurality of starting RB locations of the first BWP. For example, a bit is used for indication. For example, 1 indicates that the terminal device has the capability of measuring reference signals on BWPs corresponding to a plurality of starting RB locations of the first BWP, and 0 indicates that the terminal device does not have the capability of measuring reference signals on BWPs corresponding to a plurality of starting RB locations of the first BWP. For a terminal device has the capability of measuring reference signals on BWPs corresponding to a plurality of starting RB locations, the network device may indicate the terminal device to measure reference signals on the BWPs corresponding to the N starting RB locations of the first BWP.

S402: The terminal device measures at least one of the M reference signals on a BWP corresponding to the N starting RB locations of the first BWP.

Refer to FIG. 5. The first BWP includes four starting RB locations (N=4). A starting RB location 1 corresponds to the BWP1, a starting RB location 2 corresponds to the BWP1, a starting RB location 3 corresponds to the BWP1, and a starting RB location 4 corresponds to the BWP1. It may be understood that, as shown in FIG. 5, in a same time unit, one of the N starting RB locations is used to measure at least one of the M reference signals.

For example, a reference signal is measured on the BWP1 corresponding to the starting RB location 1 in a time unit 1, and a reference signal is measured on the BWP1 corresponding to the starting RB location 2 in a time unit 2, a reference signal is measured on the BWP1 corresponding to the starting RB location 3 in a time unit 3, and a reference signal is measured on the BWP1 corresponding to a starting RB location 4 in a time unit 4. The time unit 1 to the time unit 4 are different time units.

In a possible implementation, the terminal device may measure corresponding reference signals on BWPs corresponding to any one or more of the N starting RB locations of the first BWP.

In still another possible implementation, the terminal device may perform measurement based on a valid starting RB location set configured by the network device. For example, if N=4, and the valid starting RB location set includes three starting RB locations, the terminal device only needs to measure reference signals on BWPs corresponding to the three starting RB locations. The valid starting RB location set may be configured by using the configuration information, or may be indicated in the first signaling (for example, a plurality of valid starting RB location sets are configured in the configuration information, and the first signaling triggers one of the valid starting RB location sets). For example, if a CSI-RS is periodically sent, the configuration information may be used to indicate a valid starting RB location set, and the terminal device only needs to perform measurement based on the valid starting RB location set. If the CSI-RS is semi-persistently or aperiodically sent, the network device may configure one or more valid starting RB location sets by using the configuration information, and trigger, by using the first signaling, the terminal device to perform measurement by using a valid starting RB location set.

In still another possible implementation, the terminal device may perform measurement based on a measurement sequence configured by the network device. If the CSI-RS is periodically sent, the configuration information may be used to indicate a measurement sequence, and the terminal device only needs to perform measurement based on the measurement sequence. If the CSI-RS is semi-persistently or aperiodically sent, the network device may configure one or more measurement sequences by using the configuration information, and trigger, by using the first signaling, the terminal device to perform measurement based on a measurement sequence.

It may be understood that, for example, N=4, the first BWP includes four starting RB locations, and a BWP corresponding to each of the four starting RB locations of the first BWP may correspond to at least one of the M reference signals. For example, N=4, and M=4, each of four starting RB locations of the first BWP may correspond to one of four reference signals. In this case, if the terminal device performs measurement based on a valid RB set, for example, the valid RB set is {a starting RB location 1, and a starting RB location 2}, in this case, the terminal device measures corresponding reference signals on a BWP corresponding to the starting RB location 1 and a BWP corresponding to the starting RB location 2 of the first BWP (for example, measurement may be performed in a measurement sequence). In another example, when N=4, and M=5, in four starting RB locations of the first BWP, one starting RB location may correspond to two of the M reference signals. For example, the starting RB location 1 corresponds to two reference signals. In this case, when measuring reference signals on a BWP corresponding to the starting RB location 1, the terminal device may measure all or some of the two corresponding reference signals.

For example, this embodiment may further include the following steps.

S403: The network device sends first signaling to the terminal device. Correspondingly, the terminal device receives the first signaling sent by the network device.

Optionally, S403 may be performed before or after S402, or S403 and S402 are simultaneously performed.

The first signaling may be understood as trigger (or activation) signaling. The first signaling indicates (or trigger or activate) to measure at least one of the M reference signals on a BWP corresponding to the N starting RB locations of the first BWP; and/or indicate to send a measurement result on a BWP corresponding to at least one of the N starting RB locations, where the measurement result includes measurement results of reference signals on BWPs corresponding to at least two of the N starting RB locations of the first BWP.

For example, the first signaling may be MAC signaling and/or DCI. For example, the reference signal is a CSI-RS. If the CSI-RS is semi-persistently sent, the first signaling in S403 may be MAC signaling. If the CSI-RS is aperiodically sent, the first signaling in S403 may be DCI.

It is to be noted that, S403 is not necessarily performed, and therefore is represented by using a dashed line in the figure. For example, if the CSI-RS is periodically sent, after the configuration information is sent, the configuration takes effect immediately, and there is no need to trigger, by using signaling, the terminal device to perform CSI-RS measurement.

The first signaling includes at least one of the following.

(1) First indication information, which indicates to measure at least one of the M reference signals on a BWP corresponding to the N starting RB locations of the first BWP. For example, the first signaling includes a field, and the field indicates whether CSI-RS measurement is triggered at the N starting RB locations of the first BWP or CSI-RS measurement is triggered at a single starting RB location of the first BWP. For example, the field may be a BWP multi-starting RB location measurement or a single-starting RB location measurement field, and occupies one bit. When the field includes 1, it indicates that CSI-RS measurement is performed at the N starting RB locations of the first BWP. When the field includes 0, it indicates that CSI-RS measurement is performed at the single starting RB location of the first BWP.

(2) Second indication information, which indicates a measurement sequence. For example, a plurality of measurement sequences (patterns) are configured in the configuration information in S401, and a measurement sequence in the plurality of measurement sequences indicated in the configuration information is triggered by using the second indication information in the first signaling. For example, the first signaling includes a field, and the field indicates a measurement sequence. For example, the field may be represented as a CSI Request, and occupies 2 bits.

(3) Third indication information, which indicates to send a measurement result on a BWP corresponding to at least one of the N starting RB locations, where the measurement result includes measurement results of reference signals on BWPs corresponding to at least two of the N starting RB locations of the first BWP.

For example, that the first signaling is DCI may be represented in the following form.

The DCI (for example, DCI format 1_1) may be indicated in one or more of the following manners.

For example, the DCI indicates measurement on a plurality of starting RB locations of the first BWP and indicates measurement on a starting RB location of the first BWP.

For example, the DCI indicates a measurement sequence of the plurality of starting RB locations of the first BWP, and/or a starting RB location.

Specifically, a CSI Request field in first DCI may be used for indication.

For example, the first signaling triggers the terminal device to measure a reference signal at a current location. It is assumed that the current location corresponds to the starting RB location 2 in the N starting RB locations of the first BWP. In a possible case, the starting RB location 2 may be different from the starting RB location in the measurement sequence. For example, the measurement sequence is {the starting RB location 3, the starting RB location 2, and the starting RB location 1}. The current location triggered by the first signaling corresponds to the starting RB location 2, and is just ranked second in the measurement sequence. Alternatively, the network device further configures a measurement start location, for example, the starting RB location 3, and the current location corresponds to the starting RB location 2 and is different from the configured measurement start location. In this case, there are many solutions. For example, in Manner 1, the terminal device cyclically moves the starting RB location based on a measurement sequence (pattern) to perform CSI-RS measurement. For example, starting from the current starting RB location 2, measurement is performed in a sequence of the starting RB location 2>the starting RB location 1>the starting RB location 3. Manner 2: The terminal device performs CSI-RS measurement on a BWP corresponding to remaining starting RB locations that are in the measurement sequence (pattern) and that are after the current starting RB location 2. For example, if the measurement sequence is {the starting RB location 3, the starting RB location 2, and the starting RB location 1}, and the starting RB location 2 is a current location, the starting RB location 1 is included in the measurement sequence and is arranged after the starting RB location 2. In this case, the terminal device measures a reference signal on a BWP corresponding to the starting RB location 1.

For example, this embodiment may further include the following steps.

S404: The terminal device receives second signaling sent by the network device, and correspondingly, the network device sends the second signaling to the terminal device.

The second signaling is used to trigger the terminal device to report measurement information, where the measurement information includes measurement results of reference signals on BWPs corresponding to at least two of the N starting RB locations.

For example, S404 may not be performed, and therefore is represented by using a dashed line in the figure. For example, in a case in which the CSI-RS is periodically sent, reporting of the measurement information does not need to be triggered by using signaling. For semi-persistent sending of the CSI-RS, the terminal device may be activated by using the second signaling to report the measurement information. It is to be noted that, for semi-persistent sending of the CSI-RS, measurement on reference signals on BWPs corresponding to the N starting RB locations is triggered by using the first signaling (for example, MAC signaling or DCI), and reporting of measurement information is triggered by using the second signaling. For example, if semi-persistent CSI reporting is performed on a PUCCH, the second signaling is MAC signaling; and if semi-persistent CSI reporting is performed on the PUSCH, the second signaling is DCI. For a case of aperiodic CSI-RS sending and aperiodic CSI reporting, the following steps are included.

S405: The terminal device sends measurement information to the network device, and correspondingly, the network device receives the measurement information sent by the terminal device.

In a first possible implementation, the terminal device sends a measurement result on a BWP corresponding to at least one of the N starting RB locations of the first BWP, where the measurement result includes measurement results of the reference signals on the BWPs corresponding to the at least two of the N starting RB locations of the first BWP.

FIG. 5 is still used as an example. Assuming that a valid starting RB location set is {the starting RB location 1, the starting RB location 2}, and the terminal device sequentially measures corresponding reference signals on a BWP corresponding to the starting RB location 1 and a BWP corresponding to the starting RB location 2 in the sequence of {the starting RB location 1, and the starting RB location 2}, and then may send, on the BWP corresponding to the starting RB location 2, measurement results of the reference signals on the BWP corresponding to the starting RB location 1 and the BWP corresponding to the starting RB location 2.

In a second implementation, the configuration information in S401 includes L reporting resources. The terminal device may send a measurement result on at least one of the L reporting resources, where the measurement result includes measurement results of reference signals on BWPs corresponding to at least two of the N starting RB locations of the first BWP. The L reporting resources included in the configuration information may be the same as or different from the N starting RB locations of the first BWP.

Certainly, the foregoing two possible implementations are applied independently, or may be applied together. If the two possible implementations are applied together, for example, the terminal device first performs reporting based on the first implementation, and if reporting cannot be performed or unsuccessfully performed (for example, a current reporting location conflicts with another data service, or the terminal device has been switched to another starting RB location for data transmission), the terminal device performs reporting based on the second implementation, that is, sends measurement information on at least one of the L reporting resources included in the configuration information.

For example, the measurement result may include measurement results of parameters such as a CQI, a PMI, and an RI of reference signals on BWPs corresponding to at least two of the N starting RB locations. Therefore, in this embodiment of this application, the terminal device may report the measurement results of the reference signals on the BWPs corresponding to the at least two starting RB locations at a time, which has relatively high efficiency.

For example, the measurement result includes at least one of the following.

(1) Measurement results of reference signals on BWPs corresponding to at least two of the N starting RB locations of the first BWP. If the reference signal is a CSI-RS, the measurement result includes channel state information CSI of BWPs corresponding to at least two of the N starting RB locations of the first BWP.

(2) An optimal measurement result of a BWP corresponding to the N starting RB locations of the first BWP. For example, in BWPs corresponding to the four starting RB locations of the first BWP in FIG. 5, a BWP corresponding to the starting RB location 1 has an optimal measurement result (for example, an optimal channel state). In this case, a measurement result of a reference signal on the BWP corresponding to the starting RB location 1 is reported.

(3) An identifier of the BWP with an optimal measurement result in the BWPs corresponding to the N starting RB locations of the first BWP. For example, in the BWPs corresponding to the four starting RB locations of the first BWP in FIG. 5, the BWP corresponding to the starting RB location 1 has an optimal measurement result (for example, an optimal channel state). In this case, an identifier of the BWP corresponding to the starting RB location 1 is reported.

(4) An identifier of a BWP, on which effective measurement is performed, in the BWPs corresponding to N starting RB locations of the first BWP. For example, in the BWPs corresponding to the four starting RB locations of the first BWP in FIG. 5, only reference signals on a BWP corresponding to the starting RB location 1 and a BWP corresponding to the starting RB location 2 are effectively measured. In this case, an identifier of the BWP corresponding to the starting RB location 1 and an identifier of the BWP corresponding to the starting RB location 2 are reported. The effective measurement may be understood as that measurement on a reference signal on a BWP corresponding to a starting RB location is successful or effective. On the contrary, ineffective measurement may be understood as that measurement of a reference signal on a BWP corresponding to the starting RB location is unsuccessful or ineffective.

(5) A measurement result of a reference signal on the BWP, on which effective measurement is performed, in the BWPs corresponding to N starting RB locations of the first BWP. For example, in the BWPs corresponding to the four starting RB locations of the first BWP in FIG. 5, only reference signals on a BWP corresponding to the starting RB location 1 and a BWP corresponding to the starting RB location 2 are effectively measured. In this case, measurement results of reference signals on the BWP corresponding to the starting RB location 1 and the BWP corresponding to the starting RB location 2 are reported.

(6) An identifier of a BWP, on which ineffective measurement is performed, in the BWPs corresponding to N starting RB locations of the first BWP. For example, in the BWPs corresponding to the four starting RB locations of the first BWP in FIG. 5, reference signals on a BWP corresponding to the starting RB location 1 and a BWP corresponding to the starting RB location 2 are ineffectively measured. In this case, an identifier of the BWP corresponding to the starting RB location 1 and an identifier of the BWP corresponding to the starting RB location 2 are reported.

(7) A measurement result of a reference signal on the BWP, on which ineffective measurement is performed, in the BWPs corresponding to N starting RB locations of the first BWP. For example, in the BWPs corresponding to the four starting RB locations of the first BWP in FIG. 5, reference signals on a BWP corresponding to the starting RB location 1 and a BWP corresponding to the starting RB location 2 are ineffectively measured. In this case, measurement results of reference signals on the BWP corresponding to the starting RB location 1 and the BWP corresponding to the starting RB location 2 are reported.

A case is considered in which at a same location, reporting of measurement results (for example, CSI) of a plurality of starting RB locations and reporting of a measurement result (for example, CSI) of a single starting RB location may overlap in time domain. In this case, reporting may be performed based on a priority. For example, a reporting priority value of the measurement results of the plurality of starting RB locations is higher than a reporting priority value of the measurement result of the single starting RB location. In this case, the terminal device preferentially reports the measurement results of the plurality of starting RB locations at the location, and then reports the measurement result of the single starting RB location. A priority relationship may be specified in a protocol or defined by a user. This is not limited in this embodiment of this application.

Embodiment 2

It is to be noted that, for Embodiment 2, refer to Embodiment 1. A difference lies in that in Embodiment 1, the first BWP includes a plurality of starting RB locations, and in Embodiment 2, the first BWP includes a plurality of second BWPs.

Figure 8:
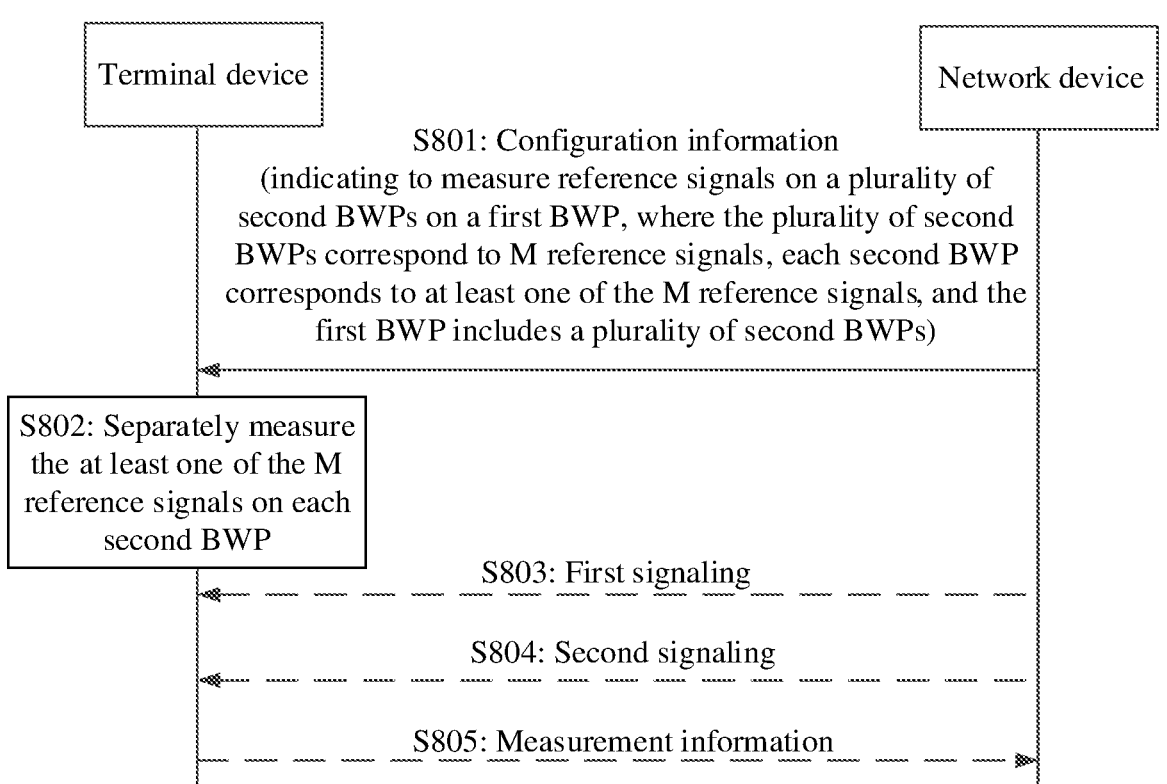
FIG. 8 is another schematic flowchart of a communication method according to an embodiment of this application.

FIG. 8 is a schematic flowchart of another communication method according to an embodiment of this application. The procedure includes:

S801: A network device sends configuration information to a terminal device. Correspondingly, the terminal device receives the configuration information sent by the network device.

For example, the configuration information may be radio resource control (RRC) signaling, or may be another signaling. This is not limited in embodiments of this application. The "configuration information" in Embodiment 2 may also be referred to as "measurement configuration information", or the like.

The configuration information indicates to measure reference signals on a plurality of second BWPs on a first BWP, the plurality of second BWPs correspond to M reference signal resources, and each second BWP corresponds to at least one of the M reference signal resources; and the first BWP includes the plurality of second BWPs.

For example, the measurement configuration information includes at least one of the following information.

(1) An identifier of a first BWP, which uniquely identifies the first BWP. The identifier may be a BWP ID of the first BWP. It may be understood that different BWPs correspond to different BWP IDs. For example, a BWP1 corresponds to a BWP ID1, and a BWP2 corresponds to a BWP ID2. Assuming that the first BWP is the BWP1, the identifier of the first BWP is the BWP ID1. Alternatively, because the first BWP may be a set (including a plurality of second BWPs), the first BWP may also be identified by using a set identifier (for example, a BWP set ID1).

(2) Identifiers of a plurality of second BWPs. For example, if an identifier of the first BWP is a BWP set ID1, identifiers of four second BWPs may respectively be a BWP ID1, a BWP ID2, a BWP ID3, and a BWP ID4.

Figure 9:
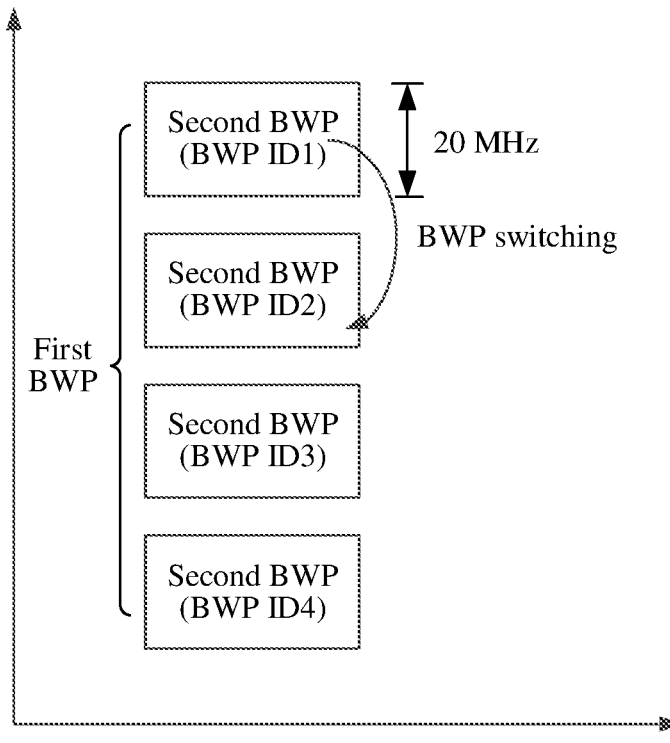
FIG. 9 is a schematic diagram of a first BWP configured for a terminal device according to an embodiment of this application.

FIG. 9 is a schematic diagram in which a first BWP includes a plurality of (for example, 4) second BWPs. An identifier of the first BWP is a BWP set ID1, and identifiers of the four second BWPs are respectively a BWP ID1, a BWP ID2, a BWP ID3, and a BWP ID4. In other words, the four second BWPs correspond to a same BWP (the first BWP).

In other words, in this embodiment of this application, one first BWP includes a plurality of second BWPs. The terminal device may measure reference signals on the plurality of second BWPs of the first BWP. For example, reference information is a CSI-RS, and the network device may obtain CSI of the plurality of second BWPs of the first BWP. In this way, the network device may schedule the terminal device to perform data transmission on a second BWP with a relatively good channel condition. For example, if a channel condition of a second BWP in the plurality of second BWPs of the first BWP is relatively good, the terminal device is scheduled to perform data transmission on the second BWP.

In addition, that the first BWP includes a plurality of second BWPs may be understood that the plurality of second BWPs of the first BWP may share a same configuration parameter except frequency locations. Therefore, when the terminal device is switched from a second BWP of the first BWP to another second BWP of the first BWP to perform reference signal measurement, only frequency locations need to be switched. In this case, because a same configuration parameter is reused, efficiency of measuring reference signals on the plurality of second BWPs on the first BWP can be improved.

(3) Indication information of a mode for measuring reference signals on the plurality of second BWPs. For example, configuration information includes a field. The field may be a multi-BWP measurement (for example, multi-BWP measurement) field. When indication information in the field is yes, it indicates that the mode for measuring reference signals on the plurality of second BWPs is enabled or activated.

(4) Resources of the M reference signals. For example, the reference signal may be a CSI-RS.

(5) A correspondence between the plurality of second BWPs and M reference signal resources. In other words, there is a correspondence between the plurality of second BWPs and the M reference signal resources (for example, CSI-RS resources). For example, one second BWP may correspond to one of the M reference signal resources, or second BWP may correspond to more of the M reference signal resources, or different second BWPs may correspond to one or more same reference signal resources in the M reference signal resources, or different second BWPs may correspond to a plurality of same reference signal resources in the M reference signal resources, where the plurality of same reference signal resources have a same frequency domain location resource and different time domain location resources.

(6) A valid BWP set, which indicates a second BWP in all second BWPs on which measurement is performed. For example, the first BWP includes four second BWPs. The valid BWP set may be all or some of the four second BWPs. For example, the set may be represented as {the BWP ID1, the BWP ID2, and the BWP ID3}. This indicates that reference signals on three of the second BWPs need to be measured, that is, a reference signal on a second BWP corresponding to the BWP ID4 do not need to be measured.

For example, configuration information includes a field, the field is a CSI-RS multi-BWP measurement set, and the field is used to configure a valid BWP set.

For example, the configuration information further indicates to arrange at least second BWPs of the plurality of second BWPs of the first BWP at which effective measurement is performed.

(7) A measurement sequence (pattern), which indicates a measurement sequence of the plurality of second BWPs. For example, if the measurement sequence is {the BWP ID3, the BWP ID1, and the BWP ID2}, a reference signal on a second BWP corresponding to the BWP ID3 is first measured, then a reference signal on a second BWP corresponding to the BWP ID1 is measured, and finally, a reference signal on a second BWP corresponding to the BWP ID2 is measured.

For example, the configuration information may be further used to indicate a BWP identifier (for example, a BWP ID) of the $1^{st}$ second BWP in the measurement sequence, or a default BWP identifier (for example, a default ID) of the $1^{st}$ second BWP in a default measurement sequence, or a default BWP identifier (for example, a default ID) of the $1^{st}$ second BWP.

For example, the configuration information may indicate one or more measurement sequences.

(8) A time offset between reference signals measured on at least two of the plurality of second BWPs. The time offset may be a slot offset and/or a symbol offset. Descriptions are provided below by using the slot offset as an example.

In a possible implementation, start slots of reference signals measured on at least two of the plurality of second BWPs of the first BWP are different, and a gap between the start slots of the reference signals is greater than a preset slot gap value.

Figure 10:
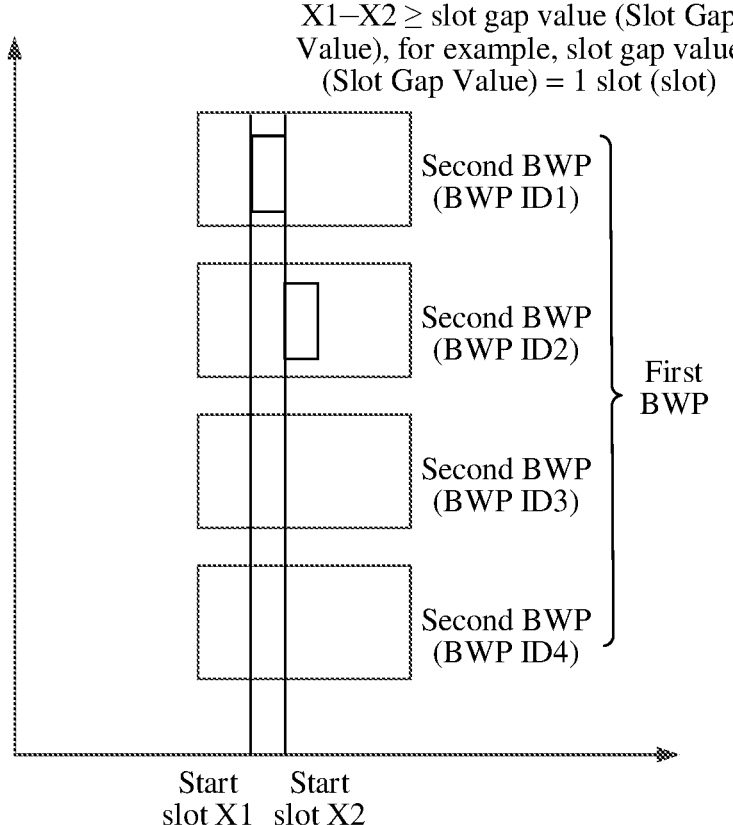
FIG. 10 is a schematic diagram of a slot relationship between M reference signal resources corresponding to a plurality of second BWPs according to an embodiment of this application.

For example, referring to FIG. 10, start time domain of a reference signal on the $1^{st}$ second BWP (the BWP ID1) of the first BWP is a slot X1; and start time domain of a reference signal on the $2^{rd}$ second BWP (the BWP ID2) of the first BWP is a slot X2. The start slot X1 is different from the start slot X2, and a difference (or a gap) between the start slot X1 and the start slot X2 is greater than the preset slot gap value (for example, one slot).

That start slots of reference signals measured on at least two of the plurality of second BWPs of the first BWP are different may include: Slot offsets of the reference signals measured on the at least two of the plurality of second BWPs of the first BWP are different, and sending periods of the reference signals measured on the at least two of the plurality of second BWPs of the first BWP are the same. The slot offset is a slot offset between a start slot of a reference signal and a reference point. The reference point may be any point (for example, a time domain location for sending first signaling or a time domain location for sending configuration information). For example, the reference point may be specified in a protocol. This is not limited in embodiments of this application.

Alternatively, that start slots of reference signals measured on at least two of the plurality of second BWPs of the first BWP are different may include: Slot offsets of the reference signals measured on the at least two of the plurality of second BWPs of the first BWP are the same, and sending periods of the reference signals measured on the at least two of the plurality of second BWPs of the first BWP are different.

In another possible implementation, start slots of reference signals measured on at least two of the plurality of second BWPs of the first BWP are the same, and a gap between start symbols of the reference signals in the start slot is greater than a preset symbol gap value.

Figure 11:
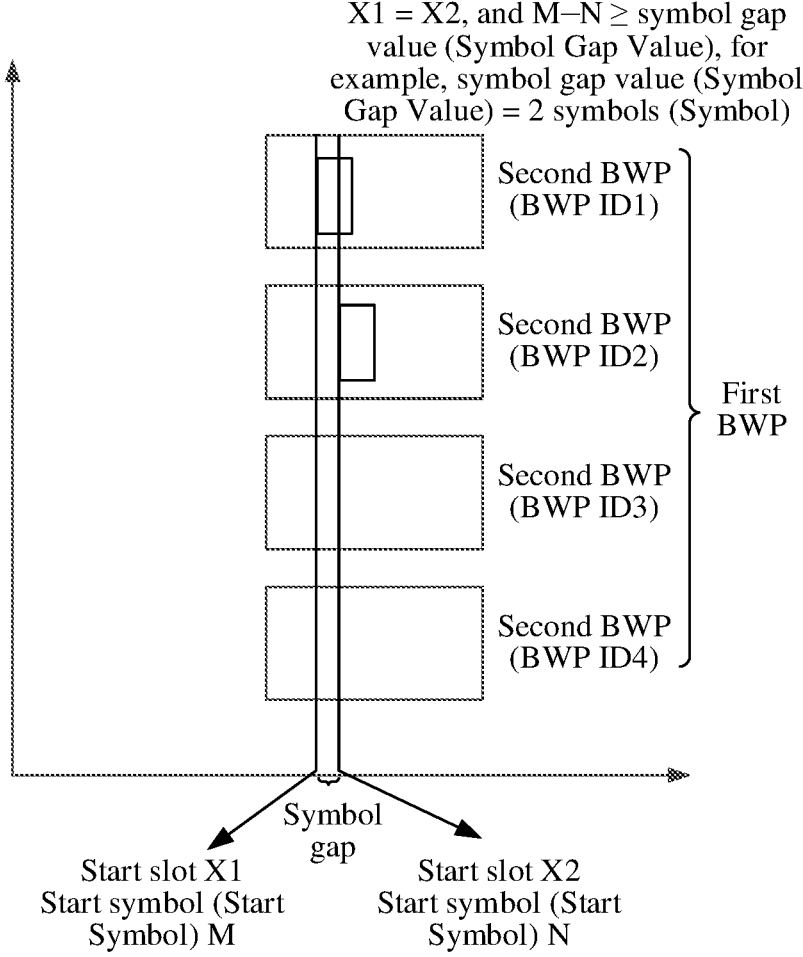
FIG. 11 is a schematic diagram of another slot relationship between M reference signal resources corresponding to a plurality of second BWPs according to an embodiment of this application.

For example, referring to FIG. 11, start time domain of a reference signal on the $1^{st}$ second BWP (the BWP ID1) of the first BWP is a slot X1; and start time domain of a reference signal on the $2^{nd}$ BWP (the BWP ID2) of the first BWP is a slot X2. The start slot X1 is the same as the start slot X2, but a gap between start symbols of the reference signals in the start slot X1 and the start slot X2 is greater than the preset symbol gap value. For example, each of the start slot X1 and the start slot X2 is a slot1, a start symbol of a reference signal on the BWP1 in the slot1 is a symbol M, a start symbol of a reference signal on the BWP2 in the slot1 is a symbol N, and a gap between the start symbol M and the start symbol N is greater than the preset symbol gap value. A specific value of the preset symbol gap value is not limited in embodiments of this application, for example, may be two symbols.

That start slots of reference signals measured on at least two of the plurality of second BWPs of the first BWP are the same may include: Slot offsets of the reference signals measured on the at least two of the plurality of second BWPs of the first BWP are the same, and sending periods of the reference signals measured on the at least two of the plurality of second BWPs of the first BWP are the same.

(9) A period, which indicates a sending period of the M reference signals. For example, periods of reference signals configured on at least two of the plurality of second BWPs of the first BWP are the same. FIG. 10 is still used as an example. A period of a reference signal on the BWP1 may be the same as a period of a reference signal on the BWP2.

(10) Information about L reporting resources, where L is an integer greater than or equal to 1, the reporting resource is a resource used to report a measurement result, and the measurement result includes measurement results of reference signals on at least two of the second BWPs.

Ten types of information are listed above, and one piece of configuration information may include one or more of the ten types of information. Alternatively, the network device may send a plurality of pieces of configuration information to the terminal device, where one piece of configuration information is used to configure one or more of the ten types of information, and the foregoing ten types of information are configured by using the plurality of pieces of configuration information.

For example, before S801, step A may be further included. A sub carrier space (SCS)-SpecificCarrier, where the SCS-SpecificCarrier may be used to determine a location and a width of a carrier bandwidth, that is, a channel bandwidth configured for the terminal device. The SCS-SpecificCarrier is greater than a maximum bandwidth of the terminal device. For example, with reference to FIG. 1 and FIG. 9, originally, the terminal device operates on a bandwidth corresponding to one of the four BWPs in FIG. 1. Assuming that the terminal device operates on a bandwidth (for example, 20 MHz) corresponding to the BWP1, the terminal device can receive and transmit data only on the bandwidth. In this embodiment of this application, the network device configures, for the terminal device, a carrier bandwidth greater than the maximum bandwidth, and a frequency bandwidth corresponding to the first BWP in FIG. 9 is greater than a frequency bandwidth corresponding to the BWP1 in FIG. 1. It may be understood that, before step A, the method may further include the following steps: The network device determines an operating frequency bandwidth of the terminal device. For example, the terminal device (for example, periodically) reports the operating frequency bandwidth to the network device. For example, when a current active BWP of the terminal device is the BWP1, the BWP1 is reported to the network device as the current active BWP, and the network device configures, for the terminal device, a frequency bandwidth that is beyond a bandwidth range of the BWP1. For example, before step A, the terminal device may further report information to the network device. The information indicates that the SCS-SpecificCarrier greater than the maximum bandwidth of the terminal device can be configured for the terminal device.

For example, the terminal device may further report capability information to the network device. The capability information indicates whether the terminal device has a capability of measuring reference signals on a plurality of BWPs included in the first BWP. For example, 1 indicates that the terminal device has the capability of measuring reference signals on a plurality of BWPs included in the first BWP, and 0 indicates that the terminal device does not have the capability of measuring reference signals on a plurality of BWPs included in the first BWP. For a terminal device has the capability of measuring reference signals on a plurality of BWPs included in the first BWP, the network device may indicate the terminal device to measure reference signals on a plurality of second BWPs in the first BWP.

S802: The terminal device separately measures at least one of the M reference signals on each second BWP.

Refer to FIG. 9. The first BWP includes four second BWPs. It may be understood that, as shown in FIG. 9, in a same time unit, a corresponding reference signal is measured on one of the four second BWPs of the first BWP. For example, a reference signal is measured on the $1^{st}$ second BWP in a time unit 1, a reference signal is measured on the $2^{rd}$ second BWP in a time unit 2, a reference signal is measured on the 3 rd second BWP in a time unit 3, and a reference signal is measured on the 4th second BWP in a time unit 4. The time unit 1 to the time unit 4 are different time units.

In a possible implementation, the terminal device may measure corresponding reference signals on any one or more of the four second BWPs of the first BWP.

In still another possible implementation, the terminal device may perform measurement based on a valid second BWP set configured by the network device. For example, if N=4, and the valid second BWP set includes three second BWPs, the terminal device only needs to measure reference signals on the three second BWPs. The valid second BWP set may be configured by using the configuration information, or may be indicated in the first signaling (for example, a plurality of valid second BWP sets are configured in the configuration information, and the first signaling triggers one of the valid second BWP sets). For example, if a CSI-RS is periodically sent, the configuration information may be used to indicate a valid second BWP set, and the terminal device only needs to perform measurement based on the valid second BWP set. If the CSI-RS is semi-persistently or aperiodically sent, one or more valid second BWP sets may be configured by using the configuration information, and the terminal device is triggered, through the first signaling, to perform measurement by using a valid second BWP set.

In still another possible implementation, the terminal device may perform measurement based on a measurement sequence configured by the network device. If the CSI-RS is periodically sent, the configuration information may be used to indicate a measurement sequence, and the terminal device only needs to perform measurement based on the measurement sequence. If the CSI-RS is semi-persistently or aperiodically sent, the network device may configure one or more measurement sequences by using the configuration information, and trigger, by using the first signaling, the terminal device to perform measurement based on a measurement sequence.

For example, the embodiment further includes the following steps.

S803: The network device sends first signaling to the terminal device. Correspondingly, the terminal device receives the first signaling sent by the network device.

Optionally, S803 may be performed before or after S802, or is simultaneously performed.

The first signaling may be understood as trigger (or activation) signaling. The first signaling indicates (or trigger or activate) to measure reference signals on a plurality of second BWPs of the first BWP, and/or indicate to send a measurement result on at least one of the plurality of second BWPs. The measurement result includes measurement results of reference signals on at least two of the plurality of second BWPs.

For example, the first signaling may be MAC signaling and/or DCI. For example, the reference signal is a CSI-RS. If the CSI-RS is semi-persistently sent, the first signaling in S802 may be MAC signaling. If the CSI-RS is aperiodically sent, the first signaling in S803 may be DCI.

It is to be noted that, S803 is not necessarily performed, and therefore is represented by using a dashed line in the figure. For example, if the CSI-RS is periodically sent, after the configuration information is sent, the configuration takes effect immediately, and there is no need to trigger, by using signaling, the terminal device to perform reference signal measurement.

The first signaling includes at least one of the following.

(1) First indication information, which indicates to measure reference signals on a plurality of second BWPs of the first BWP. For example, the first signaling includes a field, and the field indicates whether CSI-RS measurement is performed on the plurality of second BWPs of the first BWP or CSI-RS measurement is performed on a single second BWP of the first BWP. For example, the field may be a multi-BWP measurement field, and occupies one bit. If the field includes 1, it indicates that CSI-RS measurement is performed on the plurality of second BWPs of the first BWP. If the field includes 0, it indicates that CSI-RS measurement is performed on the single second BWP of the first BWP.

(2) Second indication information, which indicates a measurement sequence. For example, a plurality of measurement sequences (patterns) are configured in the configuration information in S801, and a measurement sequence in the plurality of measurement sequences indicated in the configuration information is triggered by using the second indication information in the first signaling. For example, the first signaling includes a field, and the field indicates a measurement sequence. For example, the field may be represented as a CSI Request field, and occupies 2 bits.

For example, that trigger signaling is DCI may be represented in the following form.

The DCI (for example, DCI format 1_1) may be indicated in one or more of the following manners.

For example, the DCI indicates measurement on a plurality of second BWPs of the first BWP and indicates measurement on a second BWP of the first BWP.

For example, the DCI indicates a measurement sequence of the plurality of second BWPs of the first BWP, and/or a second BWP.

Specifically, a CSI Request field in the DCI may be used for indication.

For example, the first signaling triggers the terminal device to measure a reference signal on a current second BWP. It is assumed that the current second BWP is the BWP ID1 in FIG. 9. In a possible case, the current second BWP may be different from a start second BWP in the measurement sequence. For example, the measurement sequence is {the BWP ID3, the BWP ID1, and the BWP ID2}. The current second BWP triggered by the first signaling is the BWP ID1, and corresponds to the BWP ID1 ranked second in the measurement sequence. Alternatively, the network device further configures a measurement start location, for example, the BWP ID3, and the current second BWP corresponds to the BWP ID1, and is different from the configured measurement start location. In this case, there are many solutions. For example, in Manner 1, the terminal device cyclically moves a frequency location based on a measurement sequence (pattern) to perform CSI-RS measurement on different second BWPs. For example, starting from the current second BWP (the BWP ID1), measurement is performed in a sequence of the BWP ID1>the BWP ID2>the BWP ID3. Manner 2: The terminal device performs, in the measurement sequence (pattern), CSI-RS measurement on remaining second BWPs that are in the measurement sequence and that are after the current second BWP. For example, if the measurement sequence is {the BWP ID3, BWP ID1, and the BWP ID2}, and the current second BWP is the BWP ID1, the BWP ID2 is included in the measurement sequence and is arranged after the current second BWP. In this case, the terminal device measures a reference signal on a BWP2 corresponding to the BWP ID2.

For example, this embodiment may further include the following steps.

S804: The terminal device receives second signaling sent by the network device, and correspondingly, the network device sends the second signaling to the terminal device.

The second signaling is used to trigger the terminal device to report measurement information, where the measurement information includes measurement results of reference signals on at least two of the plurality of second BWPs.

For example, S804 may not be performed, and therefore is represented by using a dashed line in the figure. For example, in a case in which the CSI-RS is periodically sent, reporting of the measurement information does not need to be triggered by using signaling. For semi-persistent sending of the CSI-RS, the terminal device may be activated by using the second signaling to report the measurement information. It is to be noted that, for semi-persistent sending of the CSI-RS, measurement on reference signals on the plurality of second BWPs of the first BWP is triggered by using the first signaling (for example, MAC signaling 1), and reporting of measurement information is triggered by using the second signaling. The second signaling may be MAC signaling 2 or DCI. For example, if semi-persistent CSI reporting is performed on a PUCCH, the second signaling is MAC signaling 2; and if semi-persistent CSI reporting is performed on the PUSCH, the second signaling is DCI. For a case of aperiodic CSI-RS sending and aperiodic CSI reporting, the first signaling and the second signaling may be a same instruction, that is, one instruction may trigger measurement of reference signals on a plurality of second BWPs of the first BWP, and may further trigger reporting of measurement information.

S805: The terminal device sends measurement information to the network device, and correspondingly, the network device receives the measurement information sent by the terminal device.

In a possible implementation, the terminal device sends a measurement result on at least one of the plurality of second BWPs of the first BWP, where the measurement result includes measurement results of reference signals on at least two of the plurality of second BWPs of the first BWP.

FIG. 9 is still used as an example. The terminal device reports measurement information on at least one of the four second BWPs in FIG. 9. The measurement information includes measurement results of reference signals on at least two of the four second BWPs. Assuming that a valid second BWP set is {the BWP ID1, and the BWP ID2}, the terminal device sequentially measures corresponding reference signals on a second BWP corresponding to the BWP ID1 and on a second BWP corresponding to the BWP ID2 in the sequence of {the BWP ID1, and the BWP ID2}, and then may send, on the second BWP corresponding to the BWP ID2, measurement results of the reference signals on the second BWP corresponding to the BWP ID1 and on the second BWP corresponding to the BWP ID2.

In another implementation, the configuration information in S801 includes L reporting resources. The terminal device may send a measurement result on at least one of the L reporting resources, where the measurement result includes measurement results of reference signals on at least two of the plurality of second BWPs of the first BWP. Locations of the L reporting resources and the plurality of second BWPs of the first BWP may be the same or different.

Certainly, the foregoing two possible implementations are applied independently, or may be applied together. If the two possible implementations are applied together, for example, the terminal device first performs reporting based on the first implementation, and if sending cannot be performed (for example, a current reporting location conflicts with another data service, or the terminal device has been switched to another BWP for data transmission), the terminal device performs reporting based on the second implementation, that is, sends measurement information on at least one of the configured L reporting resources.

For example, the measurement result may include measurement results of parameters such as a CQI, a PMI, and an RI of reference signals on at least two of the plurality of second BWPs of the first BWP. Therefore, in this embodiment of this application, the terminal device may report the measurement results of the reference signals on the at least two second BWPs at a time, which has relatively high efficiency.

For example, the measurement result includes at least one of the following.

(1) Measurement results of reference signals on at least two of the plurality of second BWPs of the first BWP. If the reference signal is a CSI-RS, the measurement result includes channel state information CSI of the at least two of the plurality of second BWPs of the first BWP.

(2) An optimal measurement result obtained by measuring the reference signals on the plurality of second BWPs of the first BWP. For example, the BWP ID1 in the four second BWPs in FIG. 9 has an optimal measurement result (for example, an optimal channel state). In this case, a measurement result of a reference signal on a second BWP corresponding to the BWP ID1 is reported.

(3) An identifier of a second BWP with an optimal measurement result in the plurality of second BWPs of the first BWP. For example, if the BWP ID1 in the four second BWPs in FIG. 9 has an optimal measurement result (for example, an optimal channel state), an identifier of the BWP ID1 is reported.

(4) An identifier of a second BWP, on which effective measurement is performed, in the plurality of second BWPs of the first BWP. For example, in the four second BWPs in FIG. 9, only reference signals on second BWPs corresponding to the BWP ID1 and the BWP ID2 are effectively measured. In this case, identifiers of the second BWPs corresponding to the BWP ID1 and the BWP ID2 are reported. The effective measurement may be understood as that measurement on a reference signal on a BWP is successful or effective. On the contrary, invalid measurement may be understood as that measurement of a reference signal on a BWP unsuccessful or ineffective.

(5) A measurement result of a reference signal on a second BWP, on which effective measurement is performed, in the plurality of second BWPs of the first BWP. For example, in the four second BWPs in FIG. 9, if only reference signals on second BWPs corresponding to the BWP ID1 and the BWP ID2 are effectively measured, measurement results of the reference signals on the second BWPs corresponding to the BWP ID1 and the BWP ID2 are reported.

(6) An identifier of a second BWP, on which ineffective measurement is performed, in the plurality of second BWPs of the first BWP. For example, in the four second BWPs in FIG. 9, reference signals on second BWPs corresponding to the BWP ID1 and the BWP ID2 are ineffectively measured. In this case, identifiers of the second BWPs corresponding to the BWP ID1 and the BWP ID2 are reported.

(7) A measurement result of a reference signal on a second BWP, on which ineffective measurement is performed, in the plurality of second BWPs of the first BWP. For example, in the four second BWPs in FIG. 9, reference signals on second BWPs corresponding to the BWP ID1 and the BWP ID2 are ineffectively measured. In this case, measurement results of reference signals on the second BWPs corresponding to the BWP ID1 and the BWP ID2 are reported.

A case is considered in which at a same location, reporting of CSI of a plurality of second BWPs and reporting of CSI of a single second BWP may overlap in time domain. In this case, reporting may be performed based on a priority. For example, a reporting priority value of the CSI of the plurality of second BWPs is higher than a reporting priority value of the CSI of the single second BWP. In this case, the terminal device preferentially reports the CSI of the plurality of second BWPs at the location, and then reports the CSI of the single second BWP at the location. A priority relationship may be specified in a protocol or defined by a user. This is not limited in this embodiment of this application.

In embodiments provided in this application, the methods provided in embodiments of this application are separately described from perspectives of the network device, the terminal device, and interaction between the network device and the terminal device. To implement functions in the method provided in embodiments of this application, the network device and the terminal device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 12:
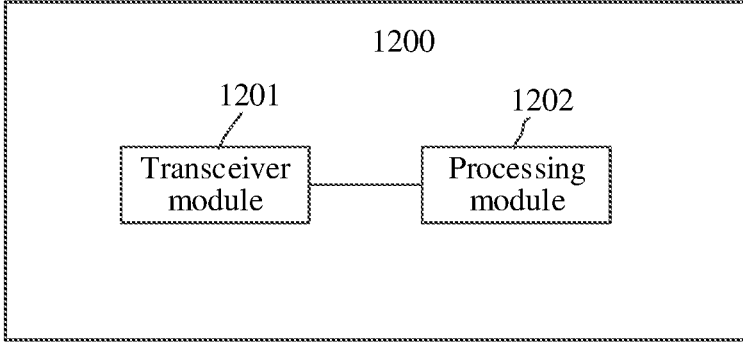
FIG. 12 is a schematic flowchart of a communication apparatus according to an embodiment of this application.
Figure 13:
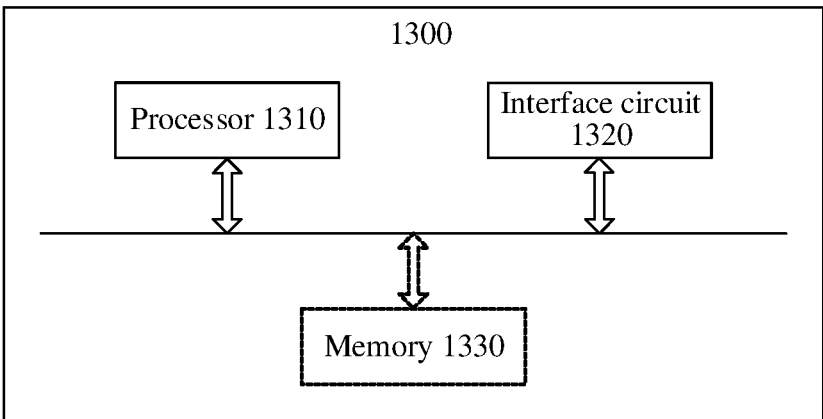
FIG. 13 is another schematic diagram of a communication apparatus according to an embodiment of this application.

FIG. 12 and FIG. 13 are schematic structural diagrams of possible communication apparatuses according to embodiments of this application. These communication apparatuses can implement functions of the terminal device or the network device in the foregoing method embodiments, and therefore can also achieve advantageous effects of the foregoing method embodiments. In this embodiment of this application, the communication apparatus may be the terminal device 110 shown in FIG. 1, or may be the access network device 120 shown in FIG. 1, or may be a module (such as a chip) used in the terminal device or the access network device.

As shown in FIG. 12, a communication apparatus 1200 includes a transceiver module 1201 and a processing module 1202. The communication apparatus 1200 may be configured to implement functions of the terminal device or the network device in the method embodiment shown in FIG. 4 or FIG. 8.

When the communication apparatus 1200 is configured to implement the functions of the terminal device in the method embodiment in FIG. 4, the transceiver module 1201 is configured to receive configuration information, where the configuration information indicates M reference signals configured on a first bandwidth part BWP, the first BWP includes N starting resource block RB locations, N is a positive integer greater than 1, and M is a positive integer greater than or equal to 1; and the N starting RB locations of the first BWP are different; and the processing module 1202 is configured to measure at least one of the M reference signals on a BWP corresponding to the N starting RB locations of the first BWP, where in a same time unit, one of the N starting RB locations is used to measure the at least one of the M reference signals.

When the communication apparatus 1200 is configured to implement the functions of the network device in the method embodiment in FIG. 4, the processing module 1202 is configured to generate configuration information, where the configuration information indicates M reference signals configured on a first bandwidth part BWP, the first BWP includes N starting resource block RB locations, N is a positive integer greater than 1, and M is a positive integer greater than or equal to 1; and the N starting RB locations of the first BWP are different; and the transceiver module 1201 is configured to send the configuration information.

When the communication apparatus 1200 is configured to implement the functions of the terminal device in the method embodiment in FIG. 8, the transceiver module 1201 is configured to receive configuration information, where the configuration information indicates to measure reference signals on a plurality of second BWPs on a first BWP, the plurality of second BWPs correspond to M reference signal resources, and each second BWP corresponds to at least one of the M reference signal resources; and the first BWP includes the plurality of second BWPs; and the processing module 1202 is configured to measure at least one of the M reference signals on each second BWP.

When the communication apparatus 1200 is configured to implement the functions of the network device in the method embodiment in FIG. 8, the processing module 1202 is configured to generate configuration information, where the configuration information indicates to measure reference signals on a plurality of second BWPs on a first BWP, the plurality of second BWPs correspond to M reference signal resources, and each second BWP corresponds to at least one of the M reference signal resources; and the first BWP includes the plurality of second BWPs; and the transceiver module 1201 is configured to send the configuration information.

For more detailed descriptions of the transceiver module 1201 and the processing module 1202, refer to related descriptions in the foregoing method embodiments. Details are not described herein again.

As shown in FIG. 13, a communication apparatus 1300 includes a processor 1310 and an interface circuit 1320. The processor 1310 and the interface circuit 1320 are coupled to each other. It may be understood that the interface circuit 1320 may be a transceiver or an input/output interface. Optionally, the communication apparatus 1300 may further include a memory 1330, configured to store instructions executed by the processor 1310, store input data required by the processor 1310 to run the instructions, or store data generated after the processor 1310 runs the instructions.

When the communication apparatus 1300 is configured to implement the method in the foregoing method embodiments, the processor 1310 is configured to perform a function of the foregoing processing module 1202, and the interface circuit 1320 is configured to perform a function of the foregoing transceiver module 1201.

When the communication apparatus is a chip used in a terminal device, the chip in the terminal device implements functions of the terminal device in the foregoing method embodiments. The chip in the terminal device receives information from another module (for example, a radio frequency module or an antenna) in the terminal device, where the information is sent by the network device to the terminal device. Alternatively, the chip in the terminal device sends information to another module (for example, a radio frequency module or an antenna) in the terminal device, where the information is sent by the terminal device to the network device.

When the communication apparatus is a chip used in a network device, the chip in the network device implements functions of the network device in the foregoing method embodiments. The chip in the network device receives information from another module (for example, a radio frequency module or an antenna) in the network device, where the information is sent by the terminal device to the network device. Alternatively, the chip in the network device sends information to another module (for example, a radio frequency module or an antenna) in the network device, where the information is sent by the network device to the terminal device.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor.

The method steps in embodiments of this application may be implemented in a hardware manner or may be implemented in a manner of executing a software instruction by a processor. The software instructions may include a corresponding software module. The software module may be stored in a random access memory (RAM), a flash memory, a read-only memory (ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in an access network device or a terminal device. Certainly, the processor and the storage medium may alternatively exist in the access network device or the terminal device as discrete components.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, or another programmable apparatus. The computer programs or the instructions may be stored in the computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state disk (SSD).

In embodiments of this application, unless otherwise specified and there is a logical conflict, terms and/or descriptions in different embodiments are consistent and may be referenced by each other. Technical features in different embodiments may be combined based on an internal logical relationship thereof to form a new embodiment.

In this application, at least one means one or more, and a plurality of means two or more. The term "and/or" is an association relationship for describing associated objects and represents that three relationships may exist. For example, A and/or B may represent the following three cases: only A exists, both A and B exist, and only B exists, where A and B may be singular or plural. In the text description of this application, the character "/" generally indicates an "or" relationship between the associated objects. In the formula of this application, the character "I" indicates a "division" relationship between the associated objects.

It may be understood that various reference numerals in embodiments of this application are merely for differentiation for ease of description, and are not intended to limit the scope of embodiments of this application. The sequence numbers of the foregoing processes do not mean execution sequences. The execution sequences of the processes should be determined based on functions and internal logic of the processes.

What is claimed is:

1. A communication method, comprising:
receiving configuration information, wherein the configuration information indicates M reference signals configured on a first bandwidth part (BWP), the first BWP comprises N starting resource block (RB) locations, Nis a positive integer greater than 1, and Mis a positive integer greater than or equal to 1, and wherein the N starting RB locations of the first BWP are different; and
measuring at least one of the M reference signals on a BWP corresponding to the N starting RB locations of the first BWP, wherein in a same time unit, one of the N starting RB locations is used to measure the at least one of the M reference signals;
wherein start slots of reference signals measured on BWPs corresponding to at least two of the N starting RB locations of the first BWP are a same start slot; and
wherein a start symbol gap of the reference signals in a slot corresponding to the same start slot is greater than a preset symbol gap value.

2. The method according to claim 1, wherein the configuration information further indicates a sequence of the N starting RB locations of the first BWP corresponding to the at least one of the M reference signals when the at least one of the M reference signals is measured.

3. The method according to claim 2, further comprising:
sending a measurement result on a BWP corresponding to at least one of the N starting RB locations of the first BWP, wherein the measurement result comprises measurement results of reference signals on BWPs corresponding to the at least two of the N starting RB locations of the first BWP.

4. The method according to claim 3, wherein before the sending the measurement result on the BWP corresponding to the at least one of the N starting RB locations of the first BWP, the method further comprises:
receiving second signaling, wherein the second signaling indicates to send the measurement result on the BWP corresponding to the at least one of the N starting RB locations of the first BWP, and the measurement result comprises the measurement results of the reference signals on the BWPs corresponding to the at least two of the N starting RB locations of the first BWP, and wherein the second signaling is media access control (MAC) signaling or downlink control information (DCI) signaling.

5. The method according to claim 1, wherein before the measuring the at least one of the M reference signals on the BWP corresponding to the N starting RB locations of the first BWP, the method further comprises:
receiving first signaling, wherein the first signaling indicates to measure the at least one of the M reference signals on the BWP corresponding to the N starting RB locations of the first BWP, and the first signaling is media access control (MAC) signaling or downlink control information (DCI) signaling.

6. A communication method, comprising:
generating configuration information, wherein the configuration information indicates M reference signals configured on a first bandwidth part (BWP), the first BWP comprises N starting resource block (RB) locations, Nis a positive integer greater than 1, and Mis a positive integer greater than or equal to 1, and wherein the N starting RB locations of the first BWP are different; and
sending the configuration information;
wherein start slots of reference signals measured on BWPs corresponding to at least two of the N starting RB locations of the first BWP are a same start slot; and
wherein a start symbol gap of the reference signals in a slot corresponding to the same start slot is greater than a preset symbol gap value.

7. The method according to claim 6, wherein the configuration information further indicates a sequence of the N starting RB locations of the first BWP corresponding to the at least one of the M reference signals when the at least one of the M reference signals is measured.

8. The method according to claim 6, further comprising:
receiving a measurement result on a BWP corresponding to at least one of the N starting RB locations of the first BWP, wherein the measurement result comprises measurement results of reference signals on BWPs corresponding to the at least two of the N starting RB locations.

9. The method according to claim 6, further comprising:
sending first signaling, wherein the first signaling indicates to measure the at least one of the M reference signals on a BWP corresponding to the N starting RB locations of the first BWP, and the first signaling is media access control (MAC) signaling or downlink control information (DCI) signaling.

10. The method according to claim 6, further comprising:
sending second signaling, wherein the second signaling indicates to send the measurement result on the BWP corresponding to the at least one of the N starting RB locations of the first BWP, and the measurement result comprises the measurement results of the reference signals on the BWPs corresponding to the at least two of the N starting RB locations of the first BWP, and wherein the second signaling is media access control (MAC) signaling or downlink control information (DCI) signaling.

11. An apparatus, comprising:
one or more processors; and
one or more memories coupled to the one or more processors and storing programming instructions for execution by the one or more processors to cause the apparatus to perform operations comprising:
    receiving configuration information, wherein the configuration information indicates M reference signals configured on a first bandwidth part (BWP), the first BWP comprises N starting resource block (RB) locations, N is a positive integer greater than 1, and M is a positive integer greater than or equal to 1, and wherein the N starting RB locations of the first BWP are different; and
    measuring at least one of the M reference signals on a BWP corresponding to the N starting RB locations of the first BWP, wherein in a same time unit, one of the N starting RB locations is used to measure the at least one of the M reference signals;
wherein start slots of reference signals measured on BWPs corresponding to at least two of the N starting RB locations of the first BWP are a same start slot; and
wherein a start symbol gap of the reference signals in a slot corresponding to the same start slot is greater than a preset symbol gap value.

12. The apparatus according to claim 11, wherein the configuration information further indicates a sequence of the N starting RB locations of the first BWP corresponding to the at least one of the M reference signals when the at least one of the M reference signals is measured.

13. The apparatus according to claim 11, wherein the operations further comprise:
    sending a measurement result on a BWP corresponding to at least one of the N starting RB locations of the first BWP, wherein the measurement result comprises measurement results of reference signals on BWPs corresponding to the at least two of the N starting RB locations of the first BWP.

14. The apparatus according to claim 13, wherein before the sending the measurement result on the BWP corresponding to the at least one of the N starting RB locations of the first BWP, the operations further comprise:
    receiving second signaling, wherein the second signaling indicates to send the measurement result on the BWP corresponding to the at least one of the N starting RB locations of the first BWP, and the measurement result comprises the measurement results of the reference signals on the BWPs corresponding to the at least two of the N starting RB locations of the first BWP, and wherein the second signaling is media access control (MAC) signaling or downlink control information (DCI) signaling.

15. The apparatus according to claim 11, wherein before the measuring the at least one of the M reference signals on the BWP corresponding to the N starting RB locations of the first BWP, the operations further comprise:
    receiving first signaling, wherein the first signaling indicates to measure the at least one of the M reference signals on the BWP corresponding to the N starting RB locations of the first BWP, and the first signaling is media access control (MAC) signaling or downlink control information (DCI) signaling.

* * * * *